(12) United States Patent
Gniadek et al.

(10) Patent No.: US 11,703,648 B2
(45) Date of Patent: Jul. 18, 2023

(54) ADAPTER

(71) Applicant: Senko Advanced Components, Inc., Marlborough, MA (US)

(72) Inventors: Jeffrey Gniadek, Oxford, ME (US); Kimman Wong, Kowloon (HK); Kazuyoshi Takano, Tokyo (JP); Siu Kei Ma, Kowloon (HK)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/581,949

(22) Filed: Jan. 23, 2022

(65) Prior Publication Data
US 2022/0146762 A1 May 12, 2022

Related U.S. Application Data

(63) Continuation of application No. 16/988,581, filed on Aug. 7, 2020, now Pat. No. 11,287,583, which is a
(Continued)

(51) Int. Cl.
*G02B 6/38* (2006.01)
*H01R 13/627* (2006.01)
(Continued)

(52) U.S. Cl.
CPC .......... *G02B 6/3893* (2013.01); *G02B 6/387* (2013.01); *H01R 13/506* (2013.01);
(Continued)

(58) Field of Classification Search
None
See application file for complete search history.

(56) References Cited

U.S. PATENT DOCUMENTS

| | | | |
|---|---|---|---|
| 8,465,317 B2 * | 6/2013 | Gniadek | H01R 43/26 439/352 |
| 9,557,491 B2 * | 1/2017 | Takano | G02B 6/3881 |

(Continued)

*Primary Examiner* — Jerry Rahll

(57) ABSTRACT

Various embodiments disclosed herein are directed to a Network system including: a connector comprising a housing comprising a groove running widthwise on a surface of the housing; and a push-pull tab comprising a complementary groove, wherein the push-pull tab is detachably connected to the housing; and a receiver device comprising one or more ports for receiving the connector, the one or more ports having an interchangeable anchor device including a first portion and a second portion; wherein the groove is configured to receive the first portion of the interchangeable anchor device when the connector is inserted into the receiving element, and wherein the complimentary groove is configured to receive the second portion of the interchangeable anchor device when the connector is inserted into the receiving element, the push-pull tab being configured to disengage the second portion of the interchangeable anchor device from the complementary groove when the push-pull tab is moved in a direction away from the connector, thereby disengaging the first portion of the interchangeable anchor device from the grove of the connector. Other aspects are described and claimed.

16 Claims, 47 Drawing Sheets

Related U.S. Application Data continuation of application No. 16/297,614, filed on Mar. 9, 2019, now Pat. No. 10,739,533, which is a continuation of application No. 15/720,980, filed on Sep. 29, 2017, now Pat. No. 10,228,521.

(60) Provisional application No. 62/546,920, filed on Aug. 17, 2017, provisional application No. 62/457,150, filed on Feb. 9, 2017, provisional application No. 62/452,147, filed on Jan. 30, 2017, provisional application No. 62/430,560, filed on Dec. 6, 2016, provisional application No. 62/430,067, filed on Dec. 5, 2016.

(51) Int. Cl.
*H01R 13/629* (2006.01)
*H01R 13/74* (2006.01)
*H01R 13/506* (2006.01)

(52) U.S. Cl.
CPC ....... *H01R 13/629* (2013.01); *H01R 13/6271* (2013.01); *H01R 13/6275* (2013.01); *H01R 13/743* (2013.01); *G02B 6/3825* (2013.01); *G02B 6/3879* (2013.01); *G02B 6/3885* (2013.01); *H01R 13/6277* (2013.01)

(56) References Cited

U.S. PATENT DOCUMENTS

| | | | | |
|---|---|---|---|---|
| 9,588,305 | B2 * | 3/2017 | Seki | G02B 6/3893 |
| 9,618,702 | B2 * | 4/2017 | Takano | G02B 6/3821 |
| 9,658,409 | B2 * | 5/2017 | Gniadek | G02B 6/3831 |
| 9,939,589 | B2 * | 4/2018 | Takano | G02B 6/387 |
| 10,228,521 | B2 * | 3/2019 | Gniadek | H01R 13/629 |
| 10,444,444 | B2 * | 10/2019 | Ma | G02B 6/3885 |
| 2003/0157825 | A1 * | 8/2003 | Kane | H01R 13/641 |
| | | | | 439/352 |
| 2005/0111796 | A1 * | 5/2005 | Matasek | G02B 6/4277 |
| | | | | 385/55 |
| 2013/0089995 | A1 * | 4/2013 | Gniadek | H01R 35/02 |
| | | | | 439/152 |
| 2015/0355417 | A1 * | 12/2015 | Takano | G02B 6/3882 |
| | | | | 385/60 |
| 2016/0131849 | A1 * | 5/2016 | Takano | G02B 6/3881 |
| | | | | 385/60 |
| 2016/0231512 | A1 * | 8/2016 | Seki | G02B 6/3893 |
| 2016/0259135 | A1 * | 9/2016 | Gniadek | G02B 6/3895 |
| 2018/0011258 | A1 * | 1/2018 | Takano | G02B 6/3812 |
| 2018/0156988 | A1 * | 6/2018 | Gniadek | H01R 13/743 |
| 2018/0217339 | A1 * | 8/2018 | Ma | G02B 6/3893 |

\* cited by examiner

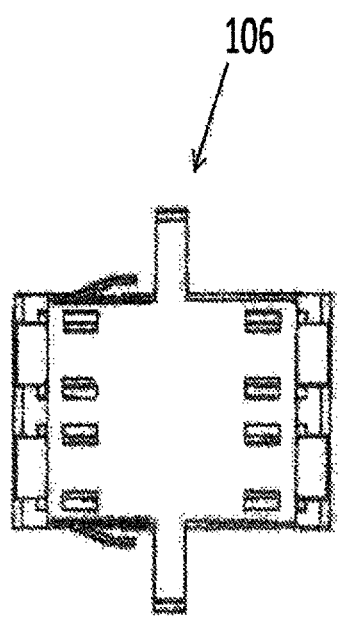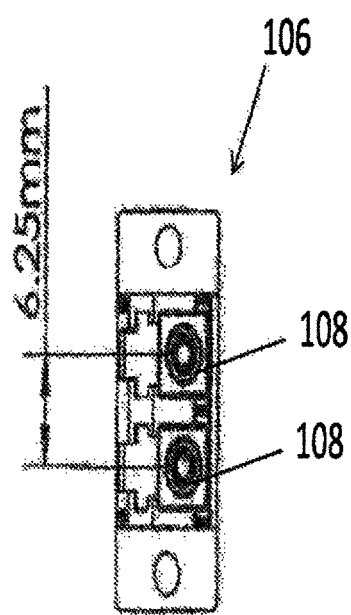
FIG. 1C
(Prior Art)
FIG. 1D
(Prior Art)

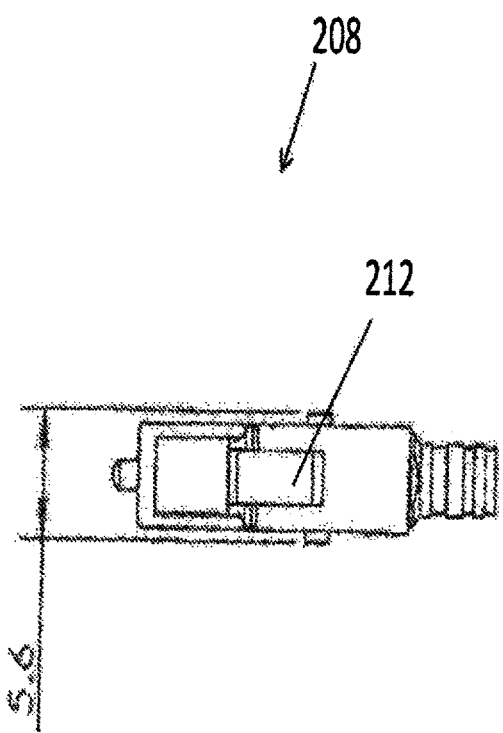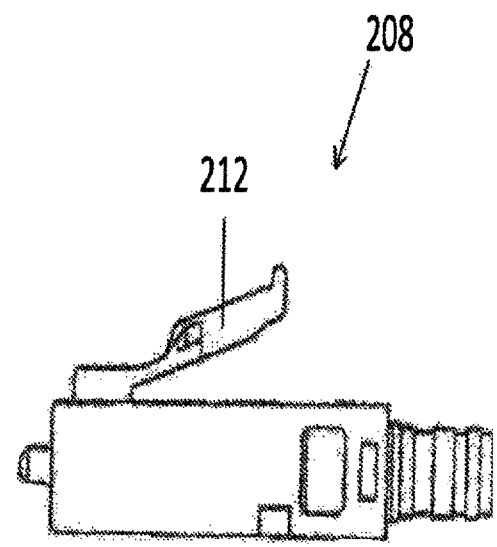
FIG. 2C
(Prior Art)
FIG. 2D
(Prior Art)

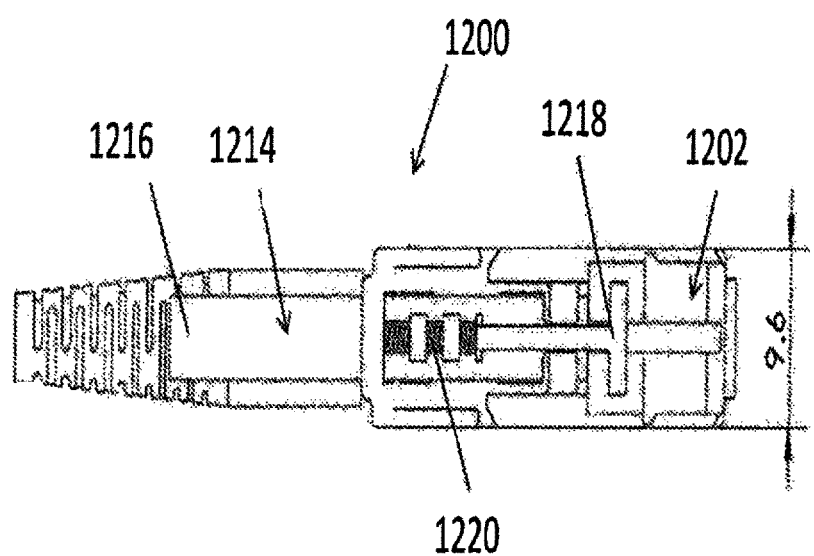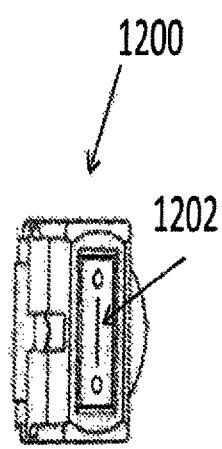
FIG. 12B
FIG. 12C

A-A
SIZE OF PLUG FRAME FITTING
INSIDE THE QSFP

2701

2708
2731

2708

SECTION A-A

SECTION B-B

ADAPTER

CROSS-REFERENCE TO RELATED-APPLICATIONS

This application is a continuation of U.S. patent application Ser. No. 16/988,581 filed on Aug. 7, 2020, entitled "NARROW WIDTH FIBER OPTIC CONNECTOR", which is a continuation of U.S. patent application Ser. No. 16/297,614 filed on Mar. 9, 2019, now U.S. Pat. No. 10,739,533 entitled "RECEIVER CONFIGURED TO ACCEPT A REMOVABLE ANCHOR DEVICE FOR SECURING A FIBER OPTIC CONNECTOR WITHIN THE RECEIVER", which is a continuation of U.S. patent application Ser. No. 15/720,980, filed Sep. 29, 2017, now U.S. Pat. No. 10,228,521 entitled "Narrow Width Adapters and Connectors with Modular Latching Arm" that claims the benefit of priority of U.S. Provisional Application No. 62/546,920 filed on Aug. 17, 2017, entitled "Narrow Width Adapters and Connectors with Modular Latching Arm" and further claims the benefit of priority of U.S. Provisional Application No. 62/457,150 filed on Feb. 9, 2017, entitled "Optical Fiber Connector" and further claims the benefit of priority of U.S. Provisional Application No. 62/452,147 filed Jan. 30, 2017, entitled "Narrow Width Adapters and Connectors with Modular Latching Arm," and further claims the benefit of priority of U.S. Provisional Application No. 62/430,560, filed Dec. 6, 2016 entitled "Narrow Width Adapters and Connectors with Spring Loaded Remote Release", and further claims the benefit of priority of U.S. Provisional Application No. 62/430,067, filed Dec. 5, 2016 entitled "Narrow Width Adapters and Connectors with Spring Loaded Remote Release" each of which is incorporated herein by reference in its entirety.

BACKGROUND

The present disclosure relates generally to connectors having remote release, and more specifically to narrow width adapters and connectors, such as narrow pitch distance Lucent Connector (LC) duplex adapters and narrow width multi-fiber connectors.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels has not been fully realized.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to individual release mechanisms. Such physical obstructions may impede the ability of an operator to minimize the stresses applied to the cables and the connectors. For example, these stresses may be applied when a user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

Small Form Factor Pluggable Transceivers (SFP) are used presently in telecommunication infrastructures within rack mounted copper-to-fiber media converters, and are also known as Ethernet switches and/or patching hubs. These infrastructure Ethernet and fiber optic connections are evolving quickly to increase connection density due to limited space for such equipment. Although fiber optic connectors have become smaller over the years, they have not been designed to be any smaller than necessary to plug into commonly sized and readily available SFPs. However, as transceiver technologies develop, smaller SFPs will be used to create higher density switches and/or patching hub equipment. Accordingly, there is a need for fiber optic connectors that will meet the needs of future developments in smaller SFPs.

SUMMARY

In summary, one aspect provides a connector comprising: a front body comprising: a top and a bottom, a recess running lengthwise on the top of the front body, and a rear body detachably connected to the front body forming a housing, wherein a portion of the rear body fits inside the front body when detachably connected; and a push-pull tab comprising a front portion, a rear portion, and one or more side portions, wherein the push-pull tab is detachably connected to the housing using the one or more side portions, wherein the front portion sits in the recess.

Another aspect provides a receiver device comprising: one or more ports for receiving a connector having a top and a bottom; the one or more ports comprising at least one cutout on the top; and the one or more ports comprising at least one guide rail on the bottom, wherein the at least one cutout is configured to receive an interchangeable anchor device.

A further aspect provides a network system comprising: a connector comprising a housing comprising a groove running widthwise on a surface of the housing; and a push-pull tab comprising a complementary groove, wherein the push-pull tab is detachably connected to the housing; and a receiver device comprising one or more ports for receiving the connector, the one or more ports having an interchangeable anchor device including a first portion and a second portion; wherein the groove is configured to receive the first portion of the interchangeable anchor device when the connector is inserted into the receiving element, and wherein the complimentary groove is configured to receive the second portion of the interchangeable anchor device when the connector is inserted into the receiving element, the push-pull tab being configured to disengage the second portion of the interchangeable anchor device from the complimentary groove when the push-pull tab is moved in a direction away from the connector, thereby disengaging the first portion of the interchangeable anchor device from the grove of the connector.

BRIEF DESCRIPTION OF THE DRAWINGS

FIG. 1C is a top view of the prior art adapter of FIG. 1B;

FIG. 1D is a front view of the prior art adapter of FIG. 1B, showing the 6.25 mm pitch;

FIG. 2C is a top view of a prior art LC connector used in the embodiments shown in FIGS. 2A and 2B;

FIG. 2D is a side view of the prior art LC connector of FIG. 2C;

FIG. 12B is a top view of the narrow width multi-fiber connector of FIG. 12A, having a width of 9.6 mm according to aspects of the present disclosure;

FIG. 12C is a front view of the narrow width multi-fiber connector of FIG. 12A according to aspects of the present disclosure;

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or component thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high-density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use, for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

Figures 1A, 1B:
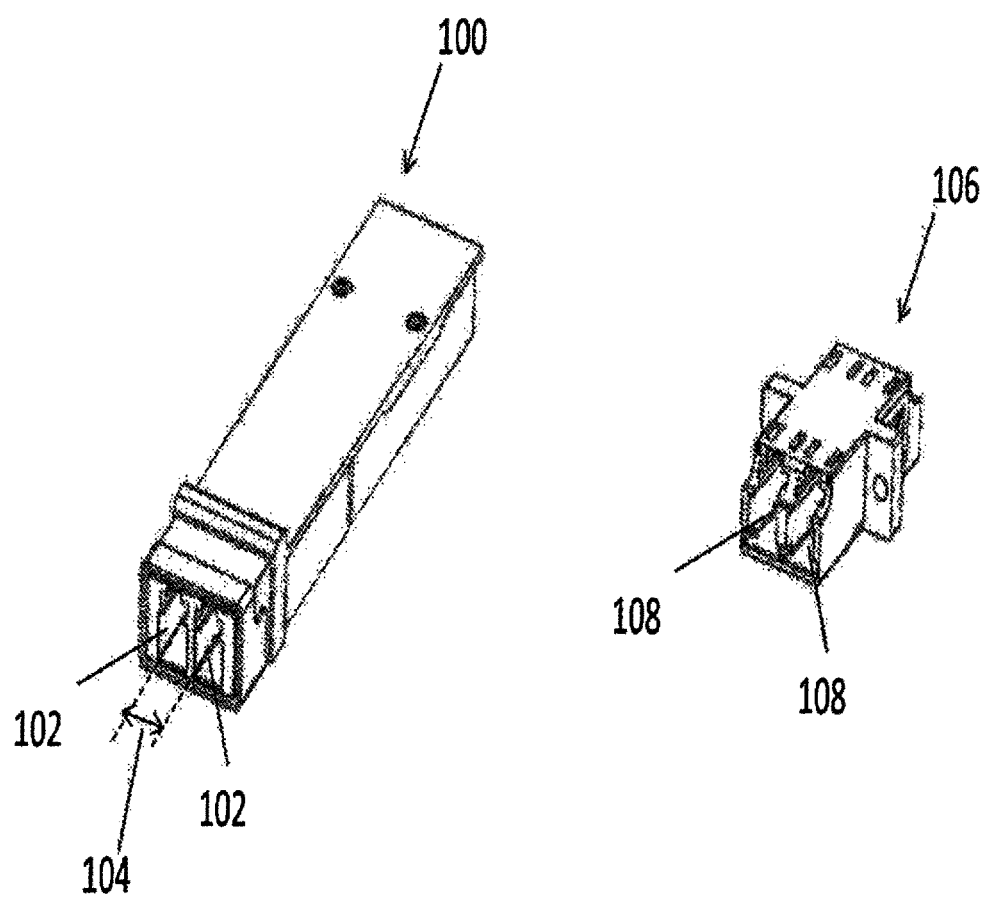
FIG. 1A is a perspective view of a prior art standard 6.25 mm pitch LC connector SFP.
FIG. 1B is a perspective view of a prior art standard 6.25 mm pitch LC adapter.

FIG. 1A shows a perspective view of a prior art standard 6.25 mm pitch LC connector SFP 100. The SFP 100 is configured to receive a duplex connector and provides two receptacles 102, each for receiving a respective LC connector. The pitch 104 is defined as the axis-to-axis distance between the central longitudinal axes of each of the two receptacles 102. FIG. 1B shows a perspective view of a prior art standard 6.25 mm pitch LC adapter 106. The adapter 106 is also configured to receive a duplex connector, and provides two receptacles 108, each for receiving a respective LC connector. FIG. 1C is a top view of the adapter 106 of FIG. 1B. The pitch of the adapter 106 is defined similarly to that of the SFP 100, as the axis-to-axis distance between the central longitudinal axes of each of the two receptacles 108, as illustrated in FIG. 1D, which shows a front view of the adapter 106.

Figures 2A, 2B:
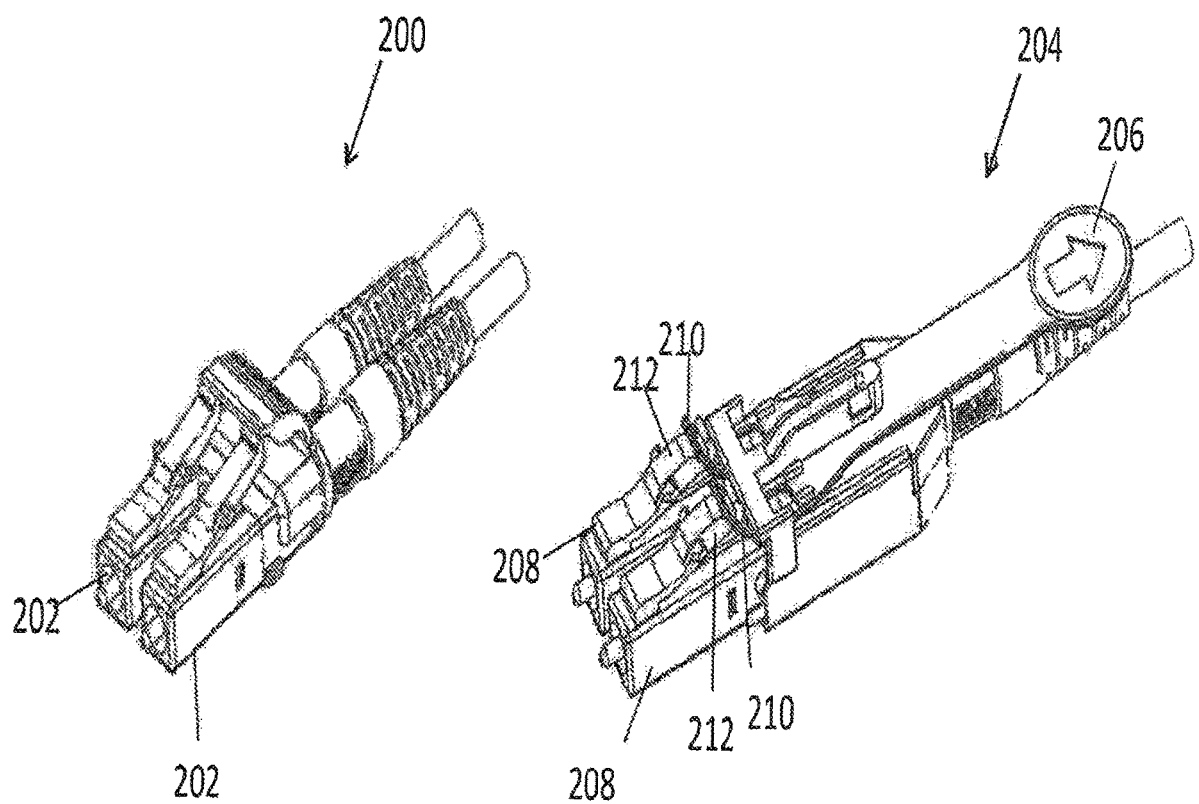
FIG. 2A is a perspective view of a prior art LC duplex connector.
FIG. 2B is a perspective view of a prior art LC duplex connector with a remote release pull tab.

FIG. 2A shows a prior art LC duplex connector 200 that may be used with the conventional SFP 100 and the conventional adapter 106. The LC duplex connector 200 includes two conventional LC connectors 202. FIG. 2B shows another prior art LC duplex connector 204 having a remote release pull tab 206, and including two conventional LC connectors 208. As shown, the remote release pull tab includes two prongs 210, each configured to couple to the extending member 212 of a respective LC connector 208. FIGS. 2C and 2D show top and side views, respectively, of the conventional LC connector 208, having a width of 5.6 mm, and further showing the extending member 212.

Figure 3:
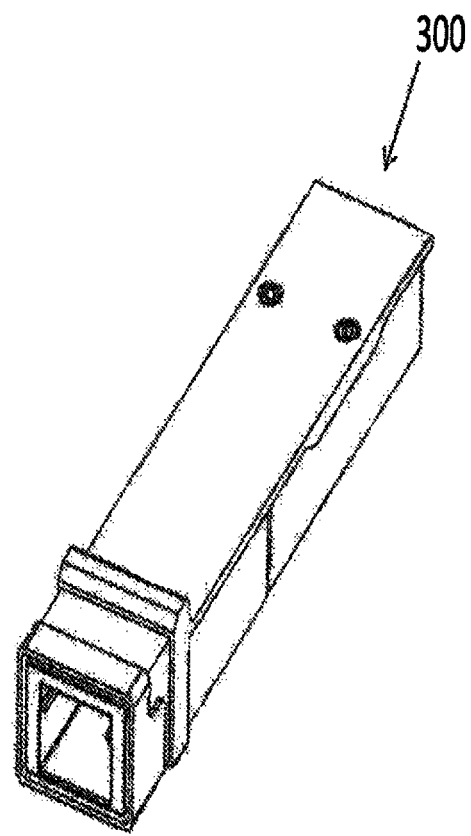
FIG. 3 is a perspective view of a future narrow pitch LC SFP for receiving connectors disclosed herein according to aspects of the present disclosure.

Various embodiments disclosed herein are configured for use with a future SFP, such as the narrow pitch LC SFP 300 shown in FIG. 3, having a pitch less than that of conventional 6.25 mm and 5.25 mm pitches. Various embodiments utilize LC type fiber optic connectors in duplex arrangements (having transmitted and receiving fibers) but with a connector axis-to-axis distance that is less than the conventional 6.25 mm and 5.25 mm pitches, as described further below.

Figures 4A, 4B, 4C:
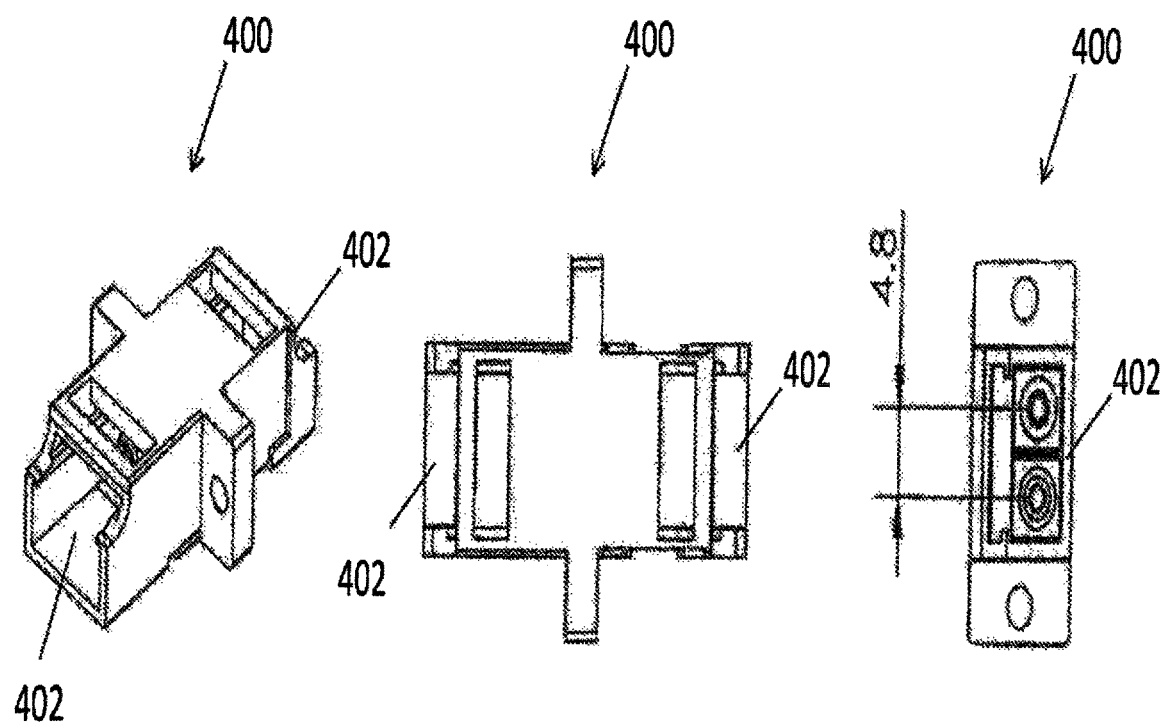
FIG. 4A is a perspective view of one embodiment of a narrow pitch LC adapter according to aspects of the present disclosure.
FIG. 4B is a top view of the narrow pitch LC adapter of FIG. 4A.
FIG. 4C is a front view of the narrow pitch LC adapter of FIG. 4A, showing a 4.8 mm pitch.

According to another aspect, embodiments of narrow pitch duplex LC adapters are disclosed. FIGS. 4A to 4C show one embodiment of a narrow pitch adapter 400. The narrow pitch adapter 400 has receptacles 402 on opposite ends thereof, configured for mating two narrow pitch LC duplex connectors according to aspects disclosed herein. FIG. 4B shows a top view of the adapter 400. FIG. 4C shows a front view, further illustrating that the adapter 400 has a pitch of 4.8 mm. The adapter 400 is configured to receive a duplex LC connector, with a pitch of the adapter corresponding to the axis-to-axis distance between the LC connectors of the LC duplex connector. Although the adapter 400 has a pitch of 4.8 mm, various embodiments of narrow pitch adapters disclosed herein may have a different pitch that is less than that of the pitch of conventional adapters, for example less than 6.25 mm and less than about 5.25 mm. In some embodiments, the pitch may be about 4.8 mm or less.

In addition to the need for narrow connectors, there is a need for remote unlatching of the narrow connectors used in dense narrow SFP arrays. This is because finger access to connectors is nearly impossible without disruption to the service of adjacent optical fibers. Although there are current designs of remotely unlatching fiber optic connectors, as shown for example in FIG. 2B, they have proven to be difficult to function as desired when plugged into the die cast construction that is typical of all SFP's. The die cast SFP is not one that is ever free of sharp edges and internal flashing (burrs) that can interfere with the normal flexing motion of the plastic latches of the fiber optic connectors. The interference between metal edges and burrs may prevent the fiber optic connector's plastic latch from either becoming fully engaged or easily disengaged, especially with latches that are remotely triggered by pull tabs that project a distance behind the connector so as to keep fingers from disturbing adjacent optical fibers.

To make the latching/unlatching of the connectors from the SFP more reliable, various embodiments disclosed herein add a spring force to the remote latching component (pull tab), for example as shown and described in relation to FIGS. 5, 7, 8 and 12 below, to ensure that the connector latches are allowed to return to the undisplaced position and thereby become fully engaged inside the SFP's recess.

Figure 5:
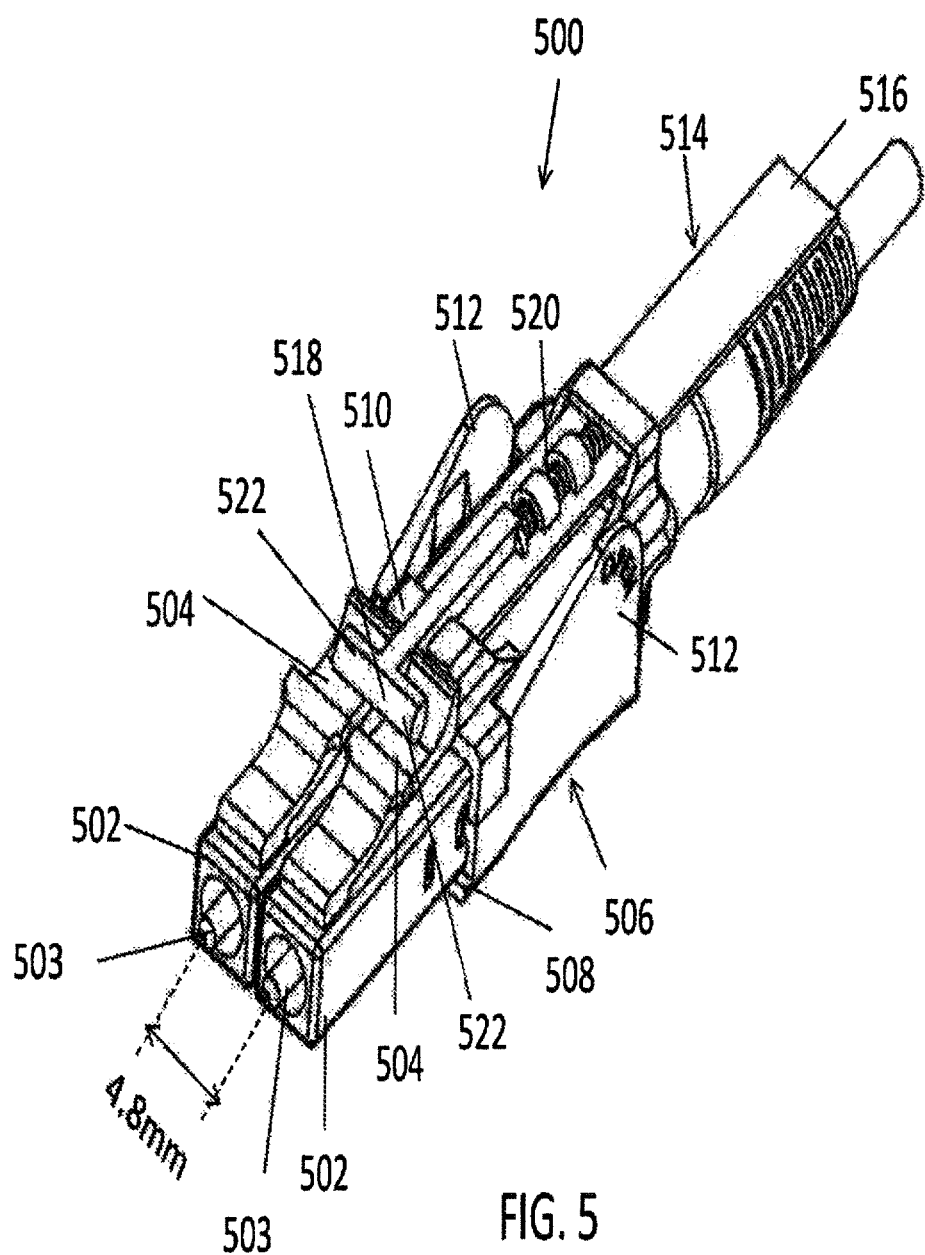
FIG. 5 is a perspective view of one embodiment of a narrow pitch LC duplex connector with remote release according to aspects of the present disclosure.

FIG. 5 shows one embodiment of a narrow pitch connector 500 according to aspects disclosed herein. The narrow pitch connector 500 is a duplex LC connector including two LC connectors 502. Each of the LC connectors 502 includes a respective ferrule 503 and a respective extending member or latching arm 504. The connector 500 has a pitch of 4.8 mm, defined as the axis-to-axis distance between the central axes of the LC connectors 502. In other embodiments, the connector pitch may be less than that of the pitch of conventional connectors, for example less than 6.25 mm and less than about 5.25 mm. In some embodiments, the pitch may be about 4.8 mm or less.

The connector 500 further includes a housing 506 having a bottom housing 508 and a top housing 510. The bottom housing 508 includes side walls 512. In various embodiments, the housing 506 of the connector 500 may be a switchable housing. The side walls 512 may be configured to open so as to facilitate opening of the housing 506, for example, to change polarity of the connector 500. The side walls 512 may be raised towards the rear of the connector 500, as shown in FIG. 5. One advantage of raising the side walls 512 towards the rear of the connector 500 is easier access. In other embodiments, the side walls 512 may be raised at another location.

The connector 500 further includes a pull tab 514 having a distal end 516 and a proximal end 518. The pull tab 514 further includes a spring 520 configured to provide a force such that the connector latching arms 504 return to the undisplaced position and thereby become fully engaged inside the SFP's recess. The distal end 516 of the pull tab 514 may be pulled to remotely release the connector 500 from an SFP or adapter. The proximal end 518 of the pull tab 514 is uniquely shaped so as to engage with the unique profile of the latching arms 504 of the narrow pitch LC connector 500. The proximal end 518 engages both latching arms 504 of the duplex LC connector 500. That is, the proximal end 518 includes a single prong configured to engage the latching arms of both connectors 502. At the proximal end 518 of the pull tab 514 there are outwardly pointing pins 522 configured to rest directly above and slide along the semi-circular surface of latching arms 504 of the duplex LC connectors 502. The horizontal and rearward path direction of the pins 522 causes the semi-circular profile of the connector latching arms 504 to flex downward. Because the pins 522 are not contained inside ramped grooves of the connector latching arms 504, the pull tab 514 can also be pushed down at a location directly behind the LC connectors 502 rather than pulling the tab in a rearward motion from a remote distance behind the connectors, such as from the distal end 516. The action of pushing down the connectors' integral levers or latching arms 504 unlatches the connector 500. In some cases, the horizontal motion of the pull tab 514 may not be desirable. Thus, the connector latching arms 504 may be pushed down without resulting in a horizontal motion of the pull tab 514.

Figure 6A:
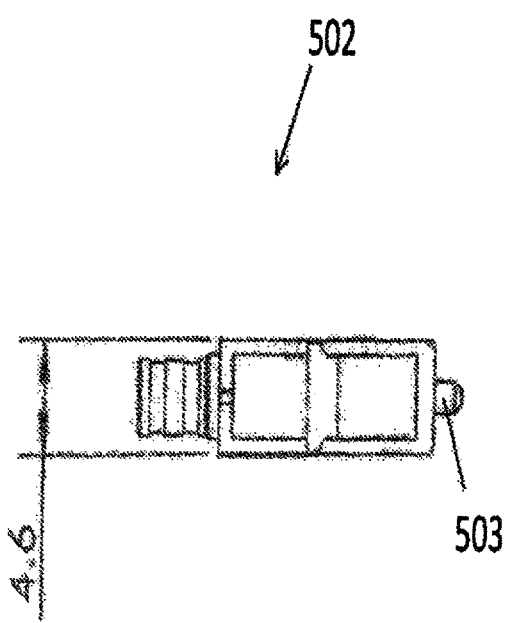
FIG. 6A is a top view of an LC connector used in the embodiment of FIG. 5 according to aspects of the present disclosure.
Figure 6B:
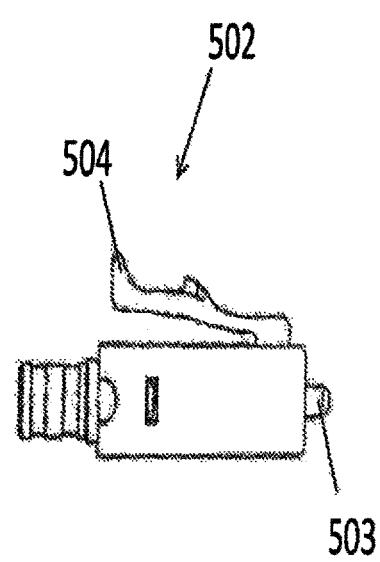
FIG. 6B is a side view of the LC connector of FIG. 6A according to aspects of the present disclosure.

FIGS. 6A and 6B show top and side views, respectively, of the LC connector 502 of the narrow pitch connector 500. FIG. 6A further shows that the LC connector 502 has a width of 4.6 mm. FIG. 6B shows the semi-circular profile of the latching arm 504.

Figure 7:
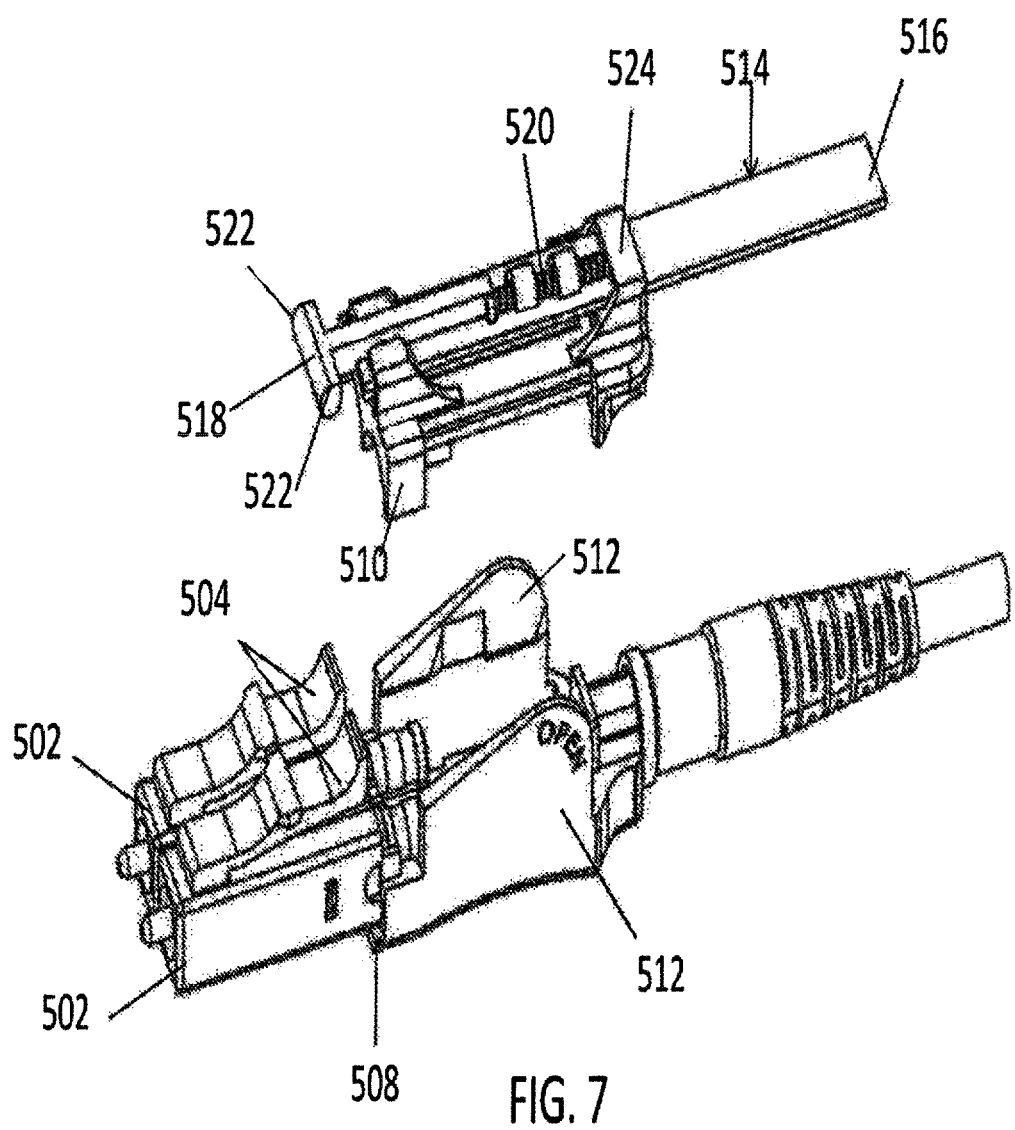
FIG. 7 is a perspective view of narrow pitch LC duplex connector of FIG. 5, with the release mechanism being removed according to aspects of the present disclosure.

FIG. 7 shows a partially disassembled view of the narrow pitch connector 500 of FIG. 5. The top housing 510 is separated from the bottom housing 508. The pull tab 514 is coupled to the top housing 510 and configured to slide longitudinally along the length of the connector. The top housing 510 also includes a restraint 524 configured to receive the pull tab 514.

Figure 8:
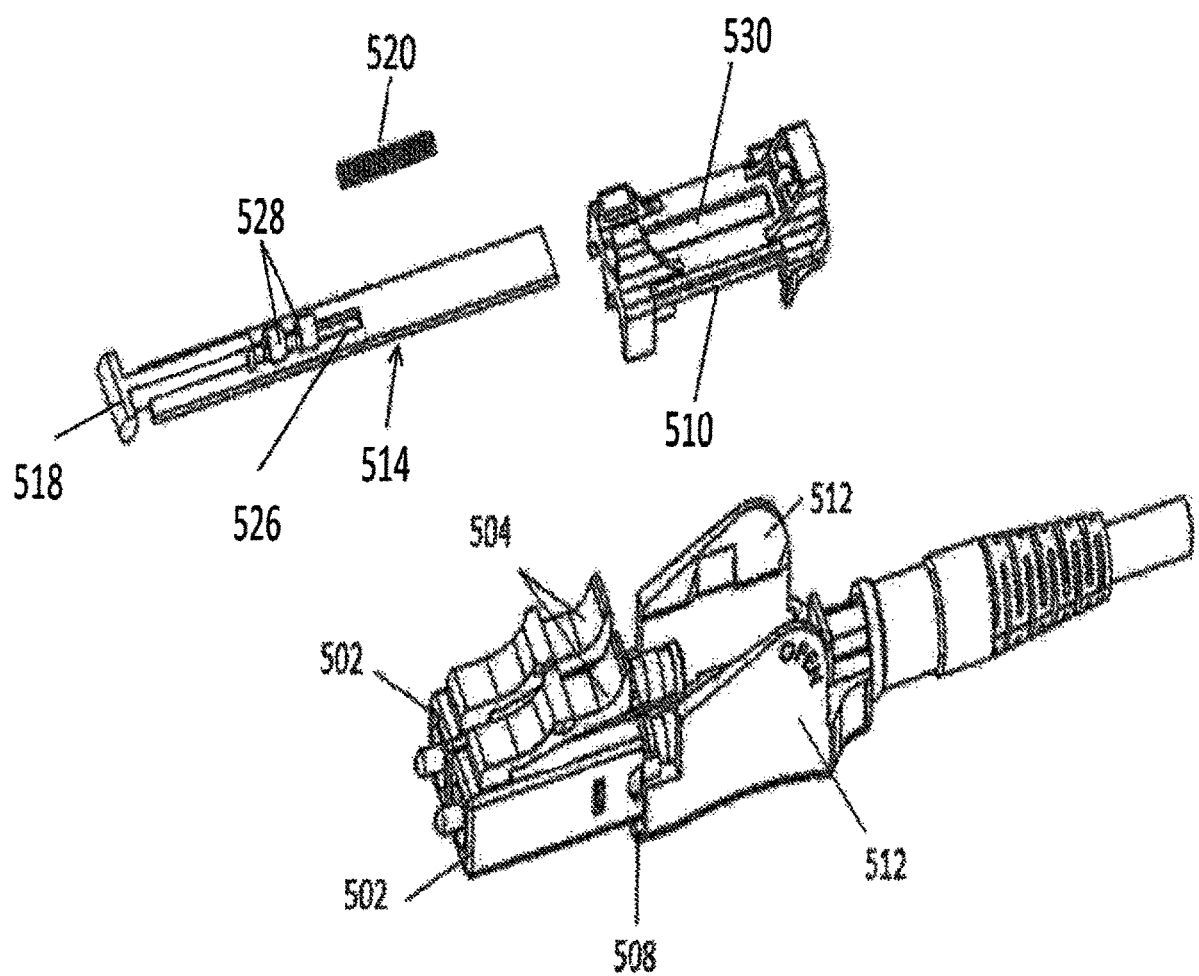
FIG. 8 is a perspective disassembled view of the narrow pitch LC duplex connector of FIG. 5 according to aspects of the present disclosure.

FIG. 8 shows a further disassembled view of the narrow pitch connector 500. Specifically, the pull tab 514 is shown to be separated from the top housing 510, and the spring 520 is removed from the pull tab. The pull tab 514 includes a longitudinal recess 526 configured to receive the spring 520, and at least one restraint 528 configured to retain the spring. The top housing 510 also includes a recess 530 configured to accommodate at least a portion of the pull tab 514, such as the spring 520 and the proximal end 518. In various embodiments, the pull tab may be removably coupled to the connector via the top housing.

Figure 9:
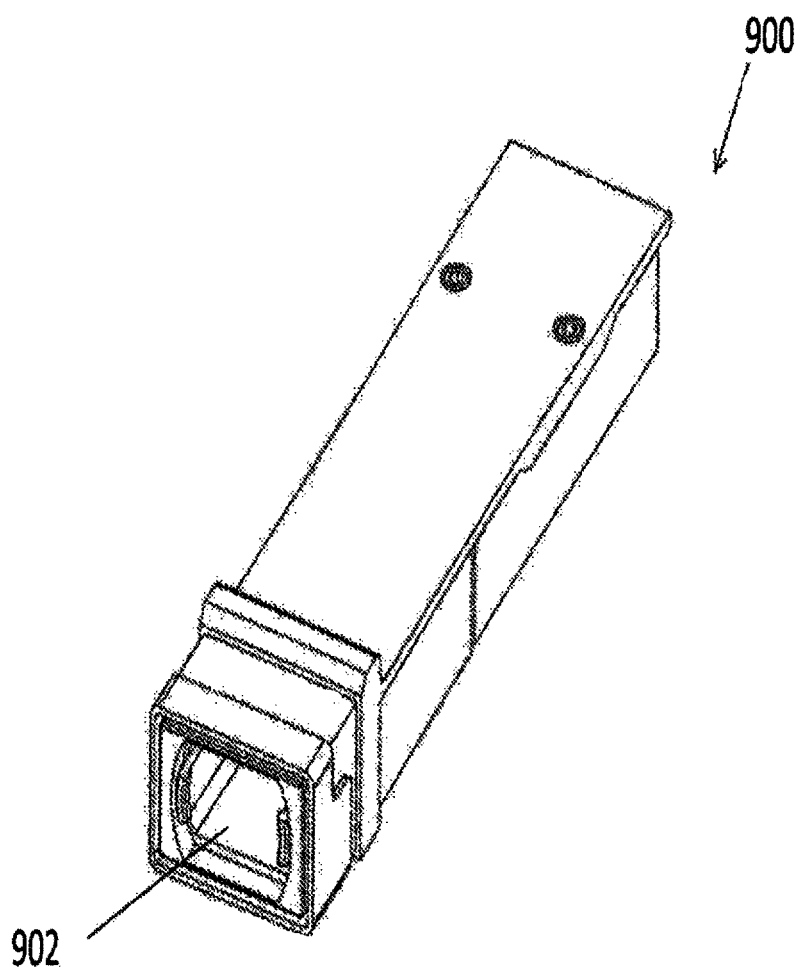
FIG. 9 is a perspective view of a prior art standard multiple-fiber push-on/pull-off (MPO) SFP.

FIG. 9 shows a perspective view of a prior art standard MPO SFP 900. The SFP 900 is configured to receive a standard MPO connector and provides a receptacle 902 for receiving an MPO connector having a conventional width, as shown for example in FIGS. 10A to 10C.

Figure 10A:
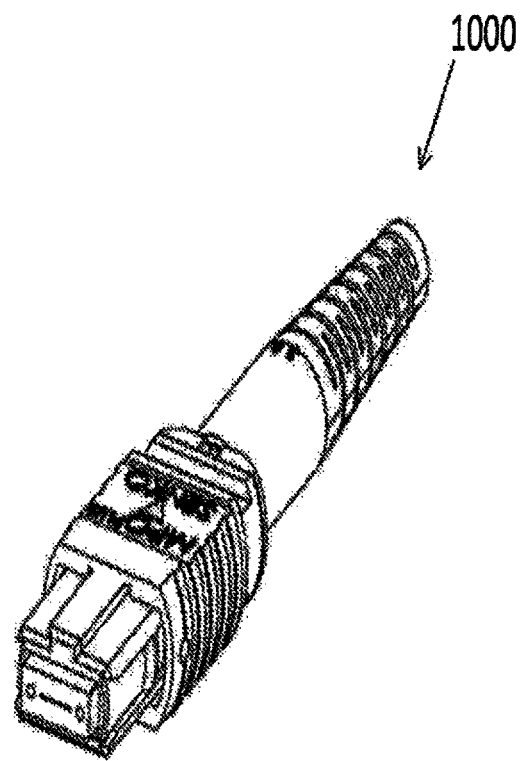
FIG. 10A is a perspective view of a prior art standard MPO connector.
Figures 10B, 10C:
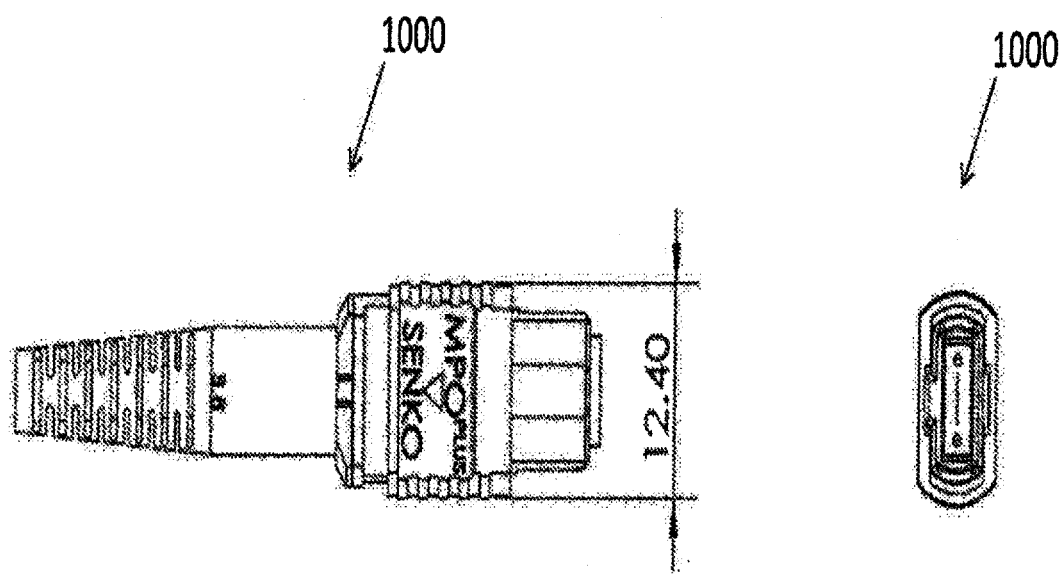
FIG. 10B is a top view of the prior art MPO connector of FIG. 10A, having a width of 12.4 mm.
FIG. 10C is a front view of the prior art MPO connector of FIG. 10A.

FIG. 10A shows a perspective view of a conventional MPO connector 1000. As shown in FIG. 10B, the conventional MPO connector 1000 has a width of 12.4 mm. FIG. 10C shows a front view of the MPO connector 1000.

Figure 11:
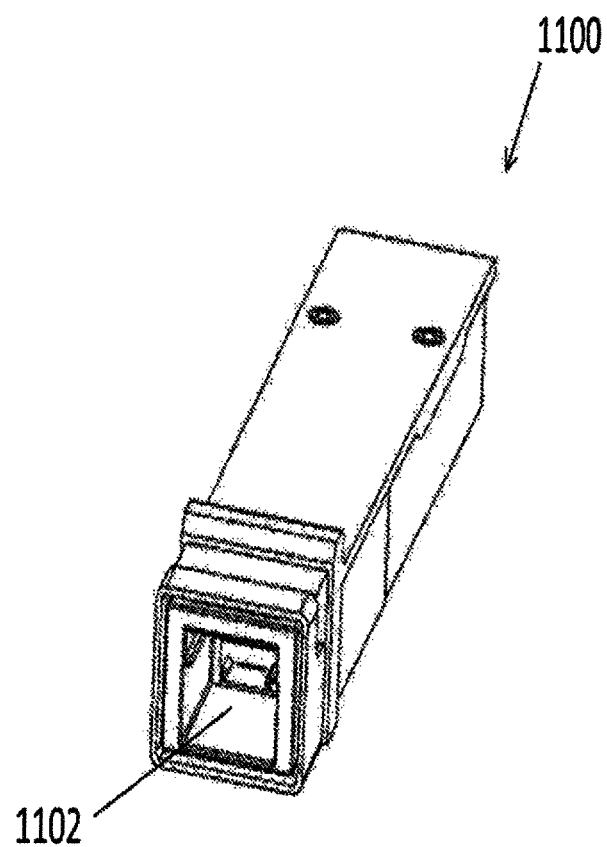
FIG. 11 is a perspective view of a future narrow width multi-fiber SFP for receiving connectors disclosed herein according to aspects of the present disclosure.

FIG. 11 shows an embodiment of a future narrow width multi-fiber SFP 1100 according to aspects of the present disclosure. Various embodiments disclosed herein are configured for use with the narrow width multi-fiber SFP 1100, having a width less than that of conventional MPO connectors, that is less than about 12.4 mm. The narrow width multi-fiber SFP has a receptacle 1102 configured to receive a narrow width multi-fiber connector, such as a narrow width connector having an MT ferrule.

Figure 12A:
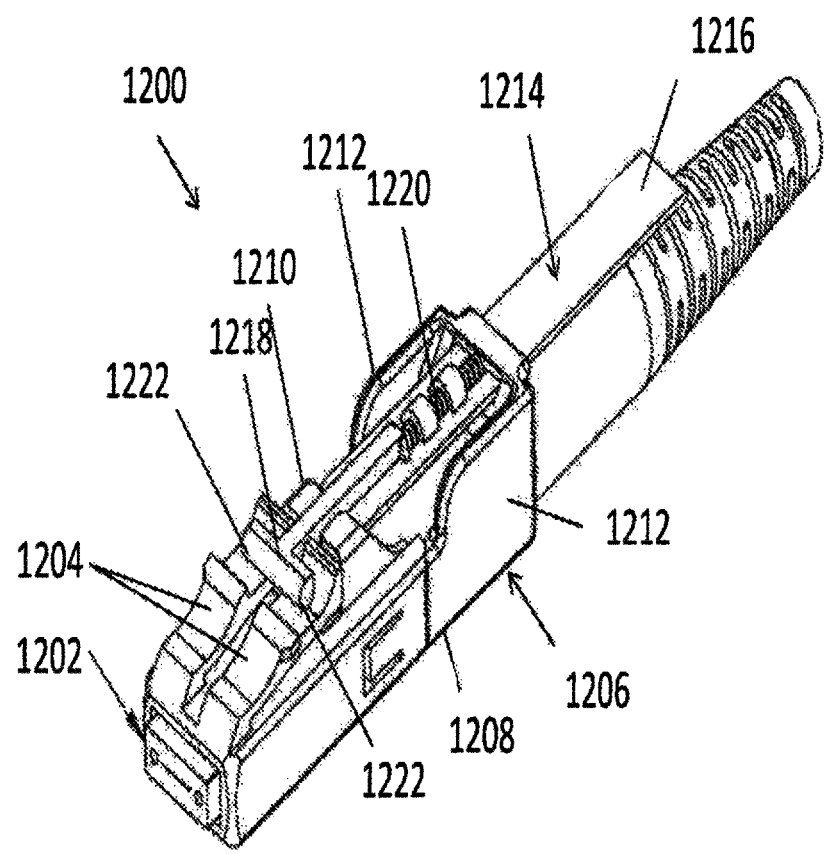
FIG. 12A is a perspective view of one embodiment of a narrow width multi-fiber connector with remote release according to aspects of the present disclosure.

FIG. 12A shows one embodiment of a narrow width connector 1200 according to aspects disclosed herein. The narrow width connector 1200 is a multi-fiber connector including a multi-fiber MT/MPO ferrule 1202. The connector 1200 includes two extending members or latching arms 1204. In other embodiments, the connector may include at least one latching arm. The connector 1200 has a width of 9.6 mm, as shown in the top view of the connector 1200 in FIG. 12B. In other embodiments, the connector width may be less than that of the width of conventional multi-fiber connectors, for example less than the 12.4 mm of the conventional MPO connector shown in FIG. 10B. In some embodiments, the width may be about 9.6 mm or less.

The connector 1200 further includes a housing 1206 having a bottom housing 1208 and a top housing 1210. The bottom housing 1208 includes side walls 1212. In various embodiments, the housing 1206 of the connector 1200 may be a switchable housing. The side walls 1212 may be configured to open so as to facilitate opening of the housing 1206, for example, to change polarity of the connector 1200. The side walls 1212 may be raised towards the rear of the connector 1200. One advantage of raising the side walls 1212 towards the rear of the connector 1200 is easier access. The side walls 1212 may also be raised at another location.

The connector 1200 further includes a pull tab 1214 having a distal end 1216 and a proximal end 1218. The pull tab 1214 further includes a spring 1220 configured to provide a force such that the connector latching arms 1204 return to the undisplaced position and thereby become fully engaged inside the SFP's recess. The distal end 1216 of the pull tab 1214 may be pulled to remotely release the connector 1200 from an SFP or adapter. The proximal end 1218 of the pull tab 1214 is uniquely shaped so as to engage with the unique profile of the latching arms 1204 of the narrow width multi-fiber connector 1200. The proximal end 1218 engages both latching arms 1204 of the multi-fiber connector 1200. That is, the proximal end 1218 includes a single prong configured to engage the latching arms 1204. At the proximal end 1218 of the pull tab 1214 there are outwardly pointing pins 1222 configured to rest directly above and slide along the semi-circular surface of latching arms 1204. The horizontal and rearward path direction of the pins 1222 causes the semi-circular profile of the connector latching arms 1204 to flex downward. Because the pins 1222 are not contained inside ramped grooves of the connector latching arms 1204, the pull tab 1214 can also be pushed down at a location directly behind the latching arms 1204 rather than pulling the tab in a rearward motion from a remote distance behind the connector, such as from the distal end 1216. The action of pushing down the connector's integral levers or latching arms 1204 unlatches the connector 1200. In some cases, the horizontal motion of the pull tab 1214 may not be desirable. Thus, the connector latching arms 1204 may be pushed down without resulting in a horizontal motion of the pull tab 1214.

FIGS. 12B and 12C show top and front views, respectively, of the narrow width multi-fiber connector 1200. FIG. 12B further shows that the connector 1200 has a width of 9.6 mm.

In various embodiments described above, the narrow width connectors have latching arms configured to engage with a fixed or immovable recess within a narrow width SFP or a narrow width adapter. In these embodiments, the pull tab of the connector displaces the flexible latching arm of the connector so as to disengage the latching arm from the recess of the SFP or the adapter. For example, the latching arms bend down as the pull tab is pulled back, so as to disengage the connector from the SFP or the adapter.

In other embodiments, as further described for example in relation with FIGS. 13A, 13B, 14, and 15 below, the remote latch release pull tab may be configured to couple with a latch or a hook within the adapter or the SFP. In these embodiments, the flexible latching arm of the connector is moved into the main cavity of the SFP or the adapter, and the latch of the SFP or the adapter engages a recess of the connector when the pull tab is in a normal location that is pushed forward by a spring. The pull tab may be configured to have a ramp area such that when the pull tab is pulled back, the latch of the SFP or the adapter is lifted by the retracted pull tab, thereby disengaging the latch of the SFP or the adapter from the connector.

Figures 13A, 13B:
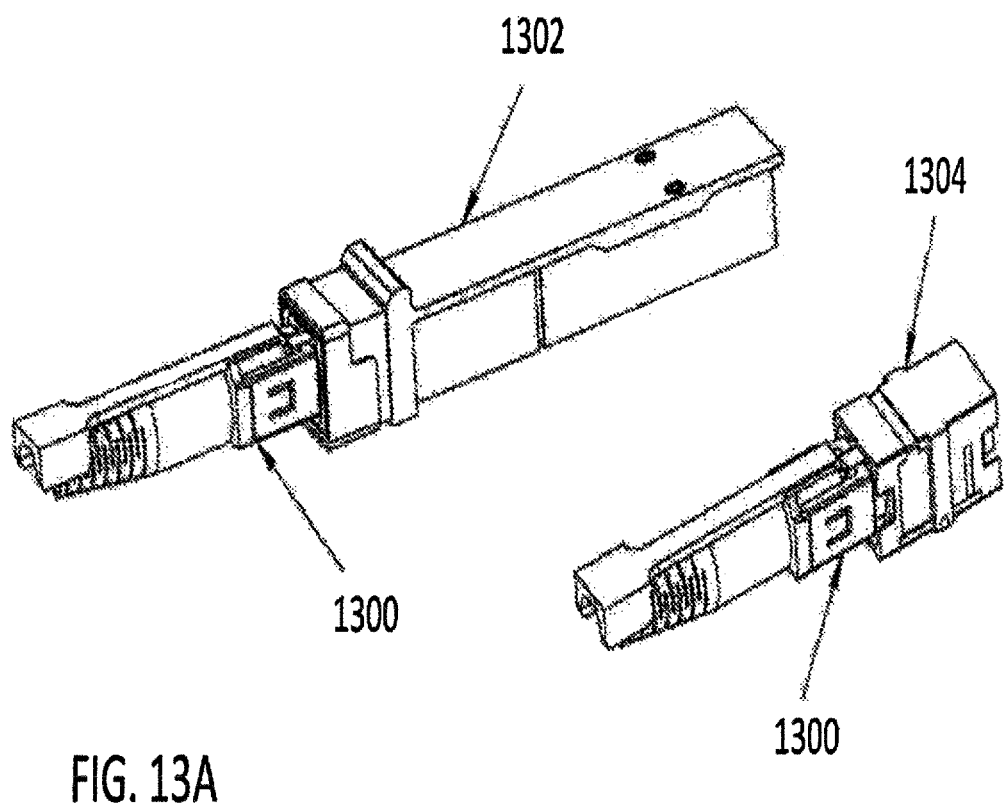
FIG. 13A is a perspective view of a narrow width multi-fiber connector inserted into a narrow width SFP having an SFP latch according to aspects of the present disclosure.
FIG. 13B is a perspective view of a narrow width multi-fiber connector inserted into a narrow width adapter having an adapter latch according to aspects of the present disclosure.

FIG. 13A shows a narrow pitch multi-fiber connector 1300 inserted into a narrow pitch SFP 1302 such that a recess of the connector engages an SFP latch. FIG. 13B shows the narrow pitch connector 1300 inserted into a narrow pitch adapter 1304 such that a recess of the connector engages a latch of the adapter.

Figure 14:
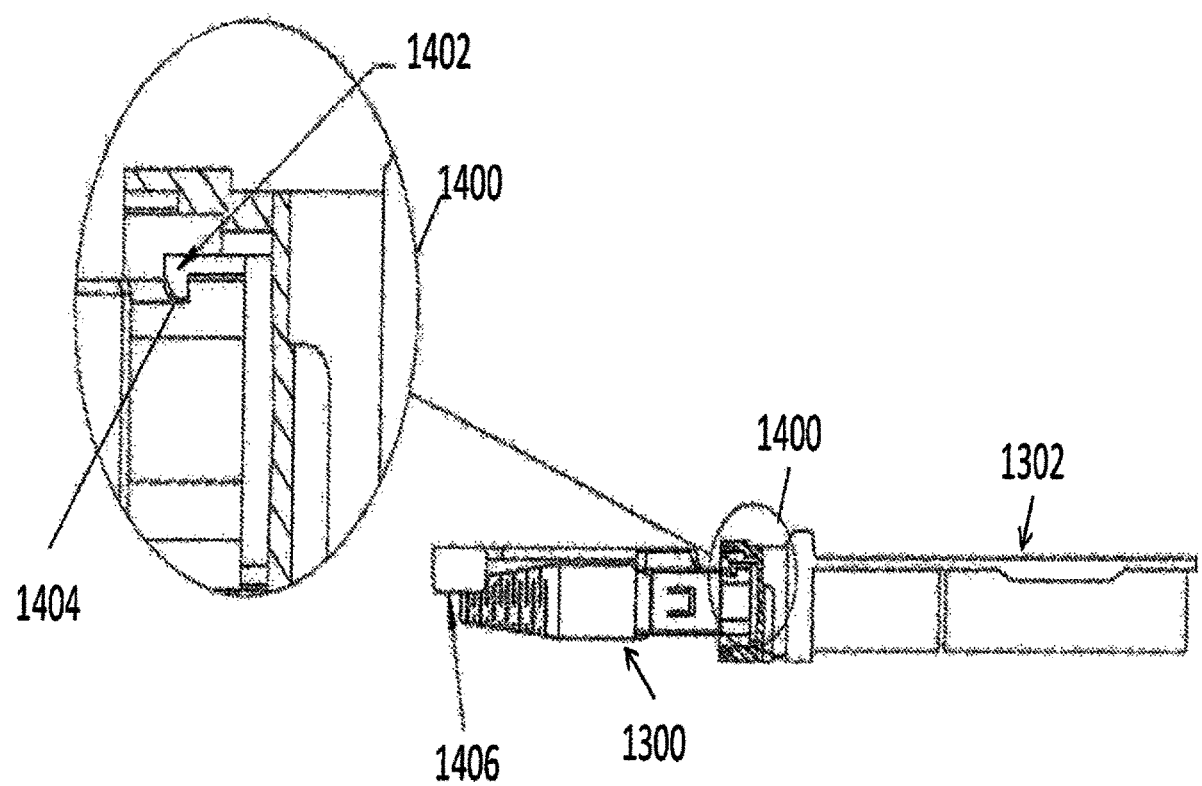
FIG. 14 is a side view of a narrow width multi-fiber connector of FIG. 13A having a recess engaged with an SFP latch in a normal pull tab position according to aspects of the present disclosure.

FIG. 14 shows a side view of the narrow width connector 1300 of FIG. 13A coupled to the narrow width SFP 1302. Details of the coupling are shown within the circle 1400. Specifically, the SFP 1302 includes an SFP latch 1402. The connector 1300 includes a recess 1404. For example, the connector housing may comprise a recess 1404. The pull tab 1406 may be spring-loaded as described in relation to various embodiments. This allows the pull tab 1406 to return to a position that will allow the SFP latch 1402 to engage with the connector recess 1404. When the pull tab 1406 is in the normal pull tab location, that is pushed forward by a spring, as shown in FIG. 14, the SFP latch 1402 is engaged with the connector recess 1404.

Figure 15:
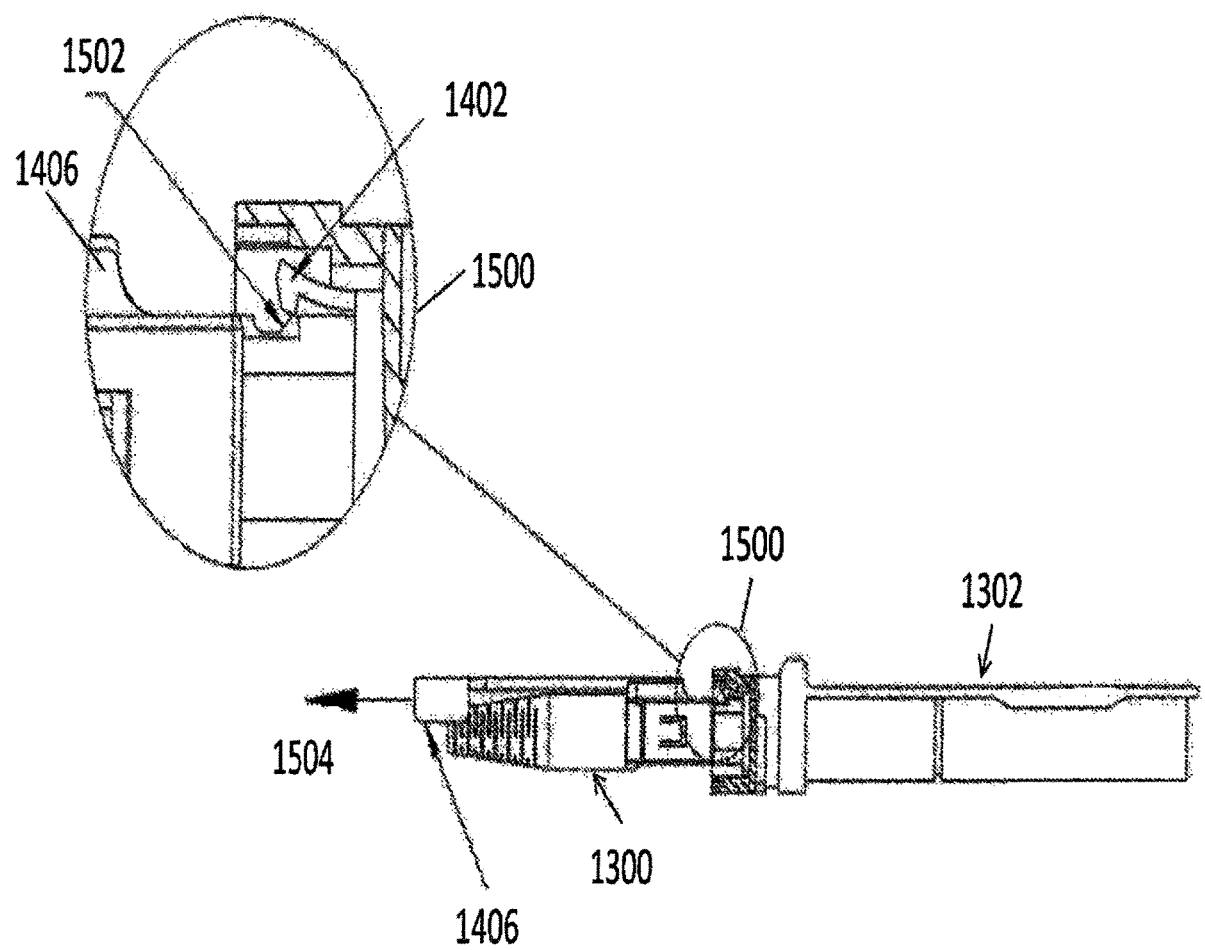
FIG. 15 is a side view of the narrow width multi-fiber connector of FIG. 13A, being disengaged from the SFP latch by retracting the pull tab according to aspects of the present disclosure.
Figure 16A:
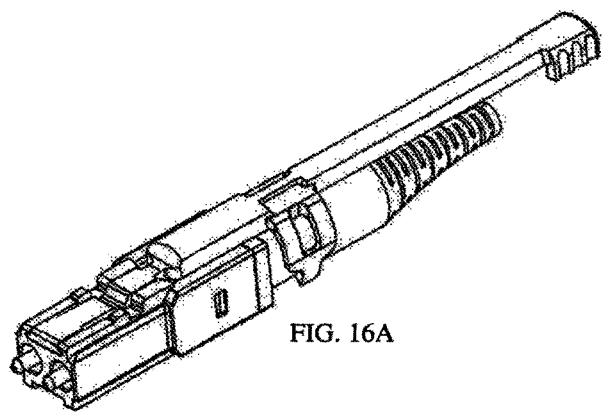
FIG. 16A is a perspective view of a narrow width multi-fiber connector having an adapter latch according to aspects of the present disclosure.
Figure 16B:
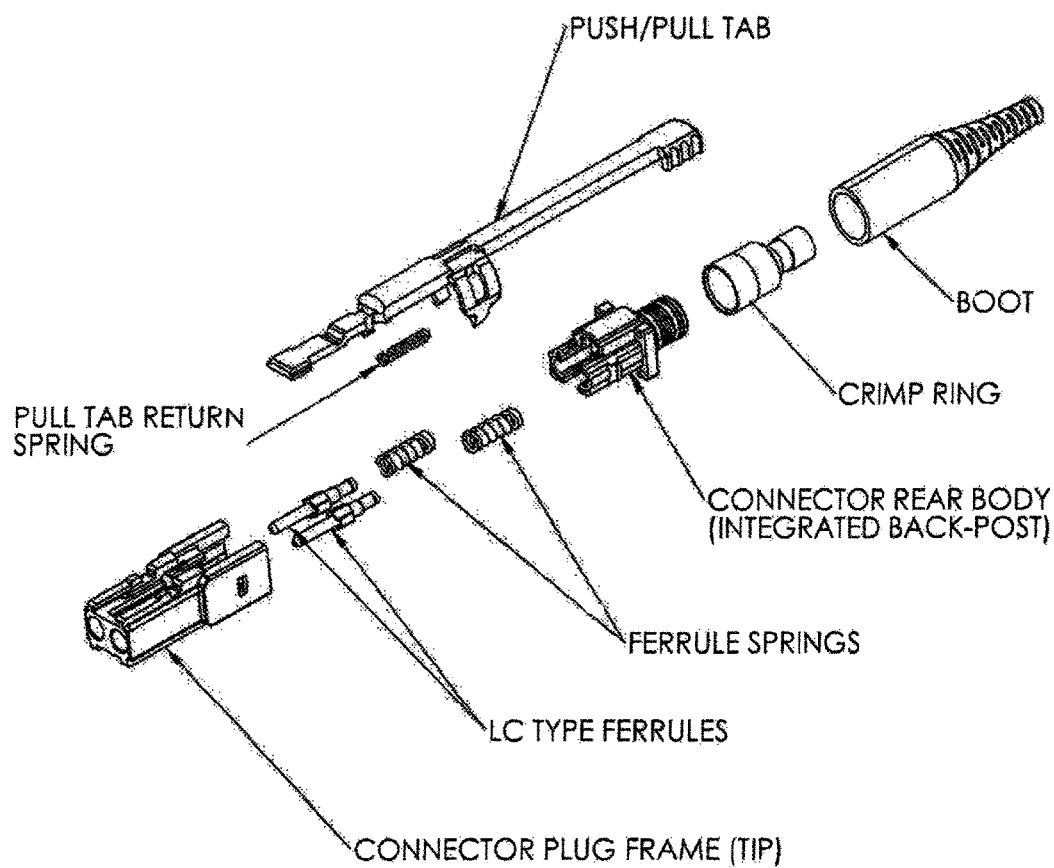
FIG. 16B is a perspective disassembled view of a narrow width multi-fiber connector having an adapter latch according to aspects of the present disclosure.
Figure 17A:
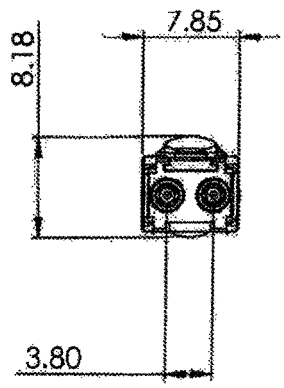
FIG. 17A is a front view of the narrow pitch adapter of FIG. 16A, showing a 3.80 mm pitch.
Figure 17B:
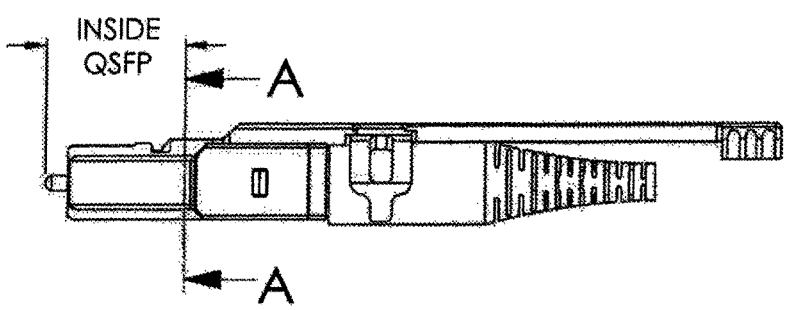
FIG. 17B is a side view of the narrow width connector of FIG. 16A.
Figure 17C:
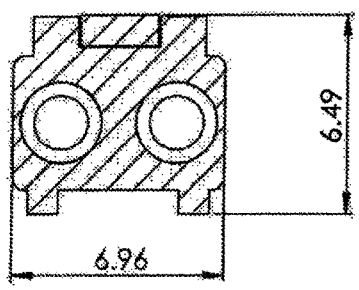
FIG. 17C is a side view of a plug frame fitting inside a SFP according to aspects of the present disclosure.
Figure 17D:
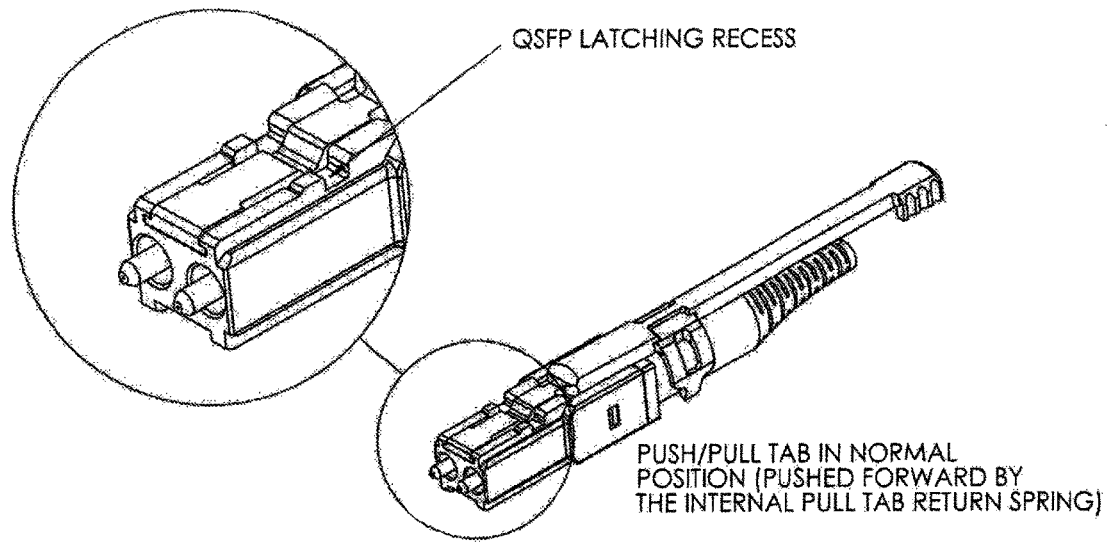
FIG. 17D is a perspective view of the narrow width connector of FIG. 16A with the push/pull tab in a normal position in the SFP latching recess according to aspects of the present disclosure.
Figure 17E:
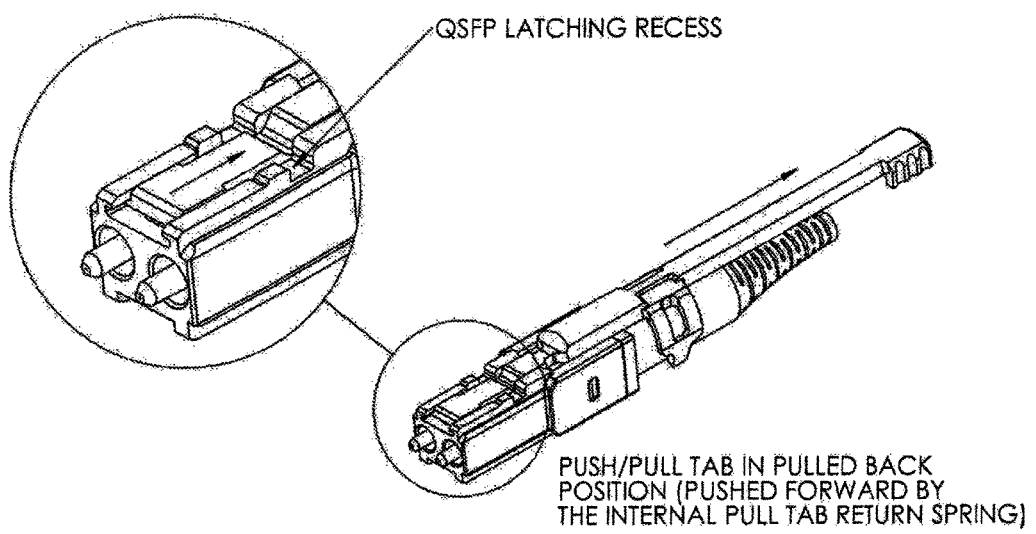
FIG. 17E is a perspective view of the narrow width connector of FIG. 16A with the push/pull tab in a pulled back position with respect to the SFP latching recess according to aspects of the present disclosure.
Figure 18A:
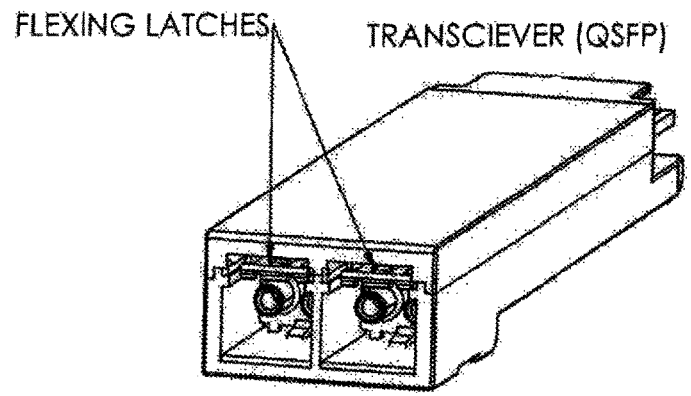
FIG. 18A is a perspective view of a small form factor transceiver according to aspects of the present disclosure.
Figure 18B:
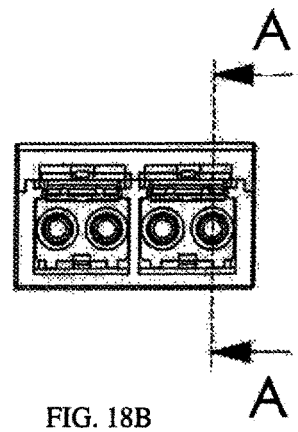
FIG. 18B and FIG. 18C are respective side views of the transceiver of FIG. 18A according to aspects of the present disclosure.
Figure 18C:
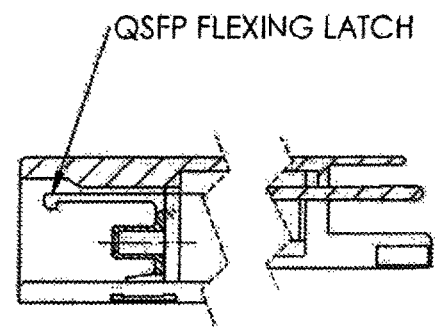
Figure 19:
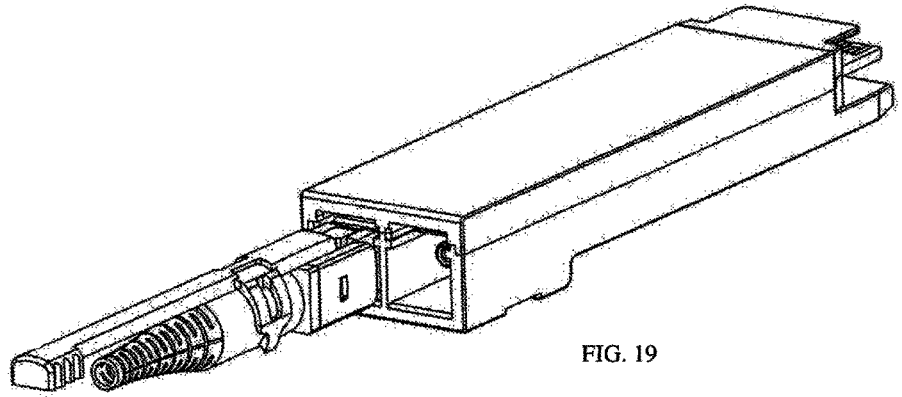
FIG. 19 is a perspective view of a SFP having one connector inserted.
Figure 20A:
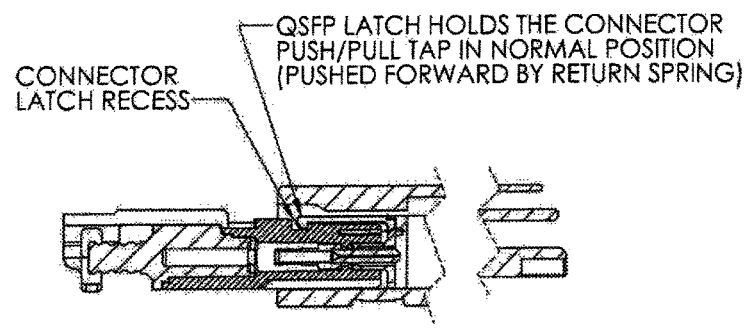
FIG. 20A and FIG. 20B are side views of a SFP holding a connector according to aspects of the present disclosure.
Figure 20B:
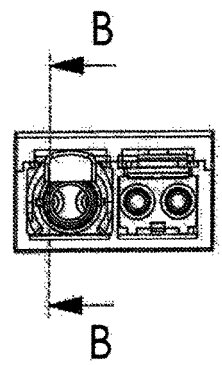
Figure 21:
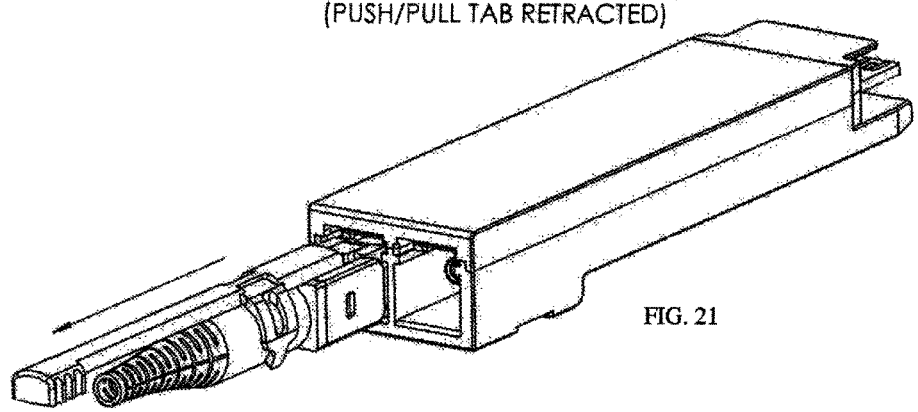
FIG. 21 is a perspective view of the SFP having one connector inserted and with the push/pull tab retracted according to aspects of the present disclosure.
Figure 22A:
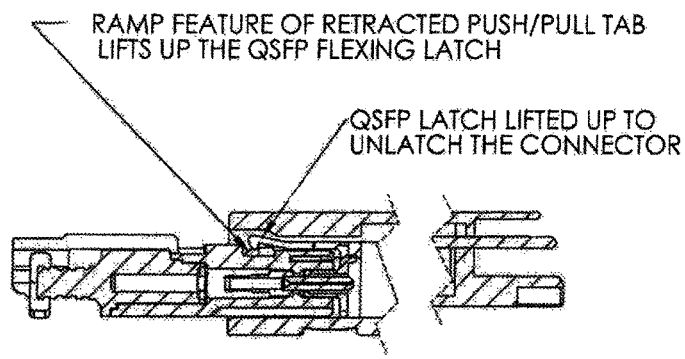
FIG. 22A and FIG. 22B are side views of the SFP latch in a lifted position to unlatch the connector according to aspects of the disclosure.
Figure 22B:
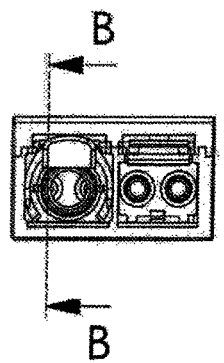

FIG. 15 shows a side view of the narrow width connector 1300 of FIG. 13A as it is disengaged from the narrow width SFP 1302. Details of the decoupling are shown within the circle 1500. The pull tab 1406 includes a taper or a ramp area 1502. As the pull tab 1406 is pulled back in the direction of the arrow 1504 as shown, the SFP latch 1402 is lifted by the ramp area 1502 of the retracted pull tab, thereby disengaging the SFP latch 1402 from the connector as illustrated within the circle 1500. The same effect described herein in conjunction with FIG. 15 also occurs in other embodiments of connectors coupled to a narrow width adapter as shown, for example, in FIG. 13A.

Although FIGS. 14 and 15 illustrate coupling of the connector to a narrow width SFP, in other embodiments the connector may be coupled to a narrow width adapter having an adapter latch, similar to that of the SFP latch. Further, although the embodiments shown in FIGS. 13A, 13B, 14, and 15 include a narrow width multi-fiber connector, other embodiments may include narrow pitch LC connectors.

FIGS. 16A-22 are various views and details that show a narrow pitch multi-fiber connector, a SFP and the latching mechanisms associated therewith according to various aspects of the invention.

Figure 23A:
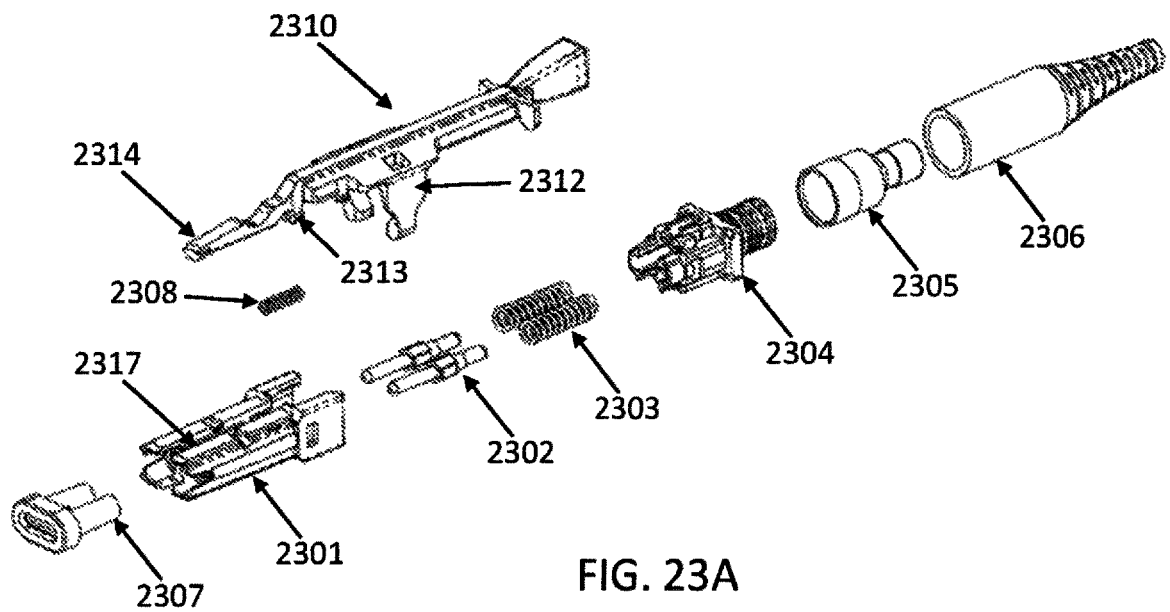
FIG. 23A is an exploded view of a connector according to aspects of the present disclosure.

As discussed herein, various types of connectors exist with various methods of implementation. Referring now to FIG. 23A, an embodiment of a CS connector is shown exploded for detail. It should be noted that this visual example is for explanatory purposes, and that various alternative examples may exist, some of which are discussed herein. In some embodiments, a CS connector may be a miniature single-position plug generally characterized by dual cylindrical, spring-loaded butting ferrule(s) of approximately 1.25 mm in diameter, and a push-pull coupling mechanism. In some embodiments, the optical alignment mechanism of the connectors is of a rigid hole or a resilient sleeve style.

In some embodiments, the CS connector may comprise a front body (i.e., plug frame) 2301, which houses the ferrule (s) and ferrules flange(s) 2302. A rear body (i.e., back post) 2304 may connect to the rear of the front body 2301 and contain the ferrule-flange(s) 2302. The ferrule-flange(s) 2302 may be held in place using one or more springs 2303. The rear body 2304, as shown, may include a crimp ring 2305 attached to the rear of the rear body. In some embodiments, a cable boot 2306 may surround the crimp ring 2305. In some embodiments, and as shown, a dust cap 2307 may be placed over the front body 2301 in order to protect the ferrules housed in the front body from damage and/or debris.

Figure 23B:
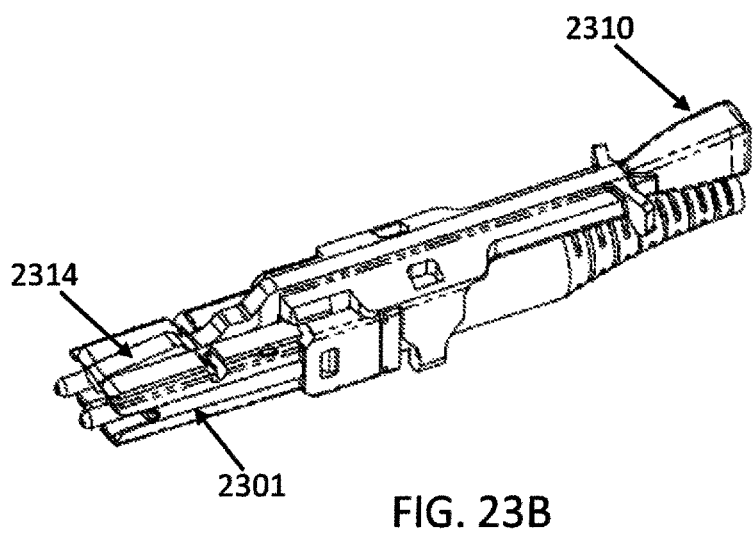
FIG. 23B is a perspective view of a connector according to aspects of the present disclosure.

In additional embodiments, a push-pull tab 2310 may attach to the CS connector, as discussed in more detail herein. The push-pull tab 2310 may have a side portion 2312 and a center protrusion (i.e., 2313), which serve various functions discussed further herein. The push-pull tab 2310 may utilize a tab spring 2308 to apply a constant directional force on the push-pull tab to allow for various benefits which are discussed herein. Referring briefly to FIG. 23B, one embodiment of an assembled CS connector with a push-pull tab is shown. In some embodiments, and as shown, the push-pull tab 2310 has a front portion 2314 which resides in a recess 2317 within the front body 2301. Thus, when the push-pull tab 2310 traverses the connector, as discussed in detail herein, the front portion 2314 moves independently of the front body 2301.

Figure 24A:
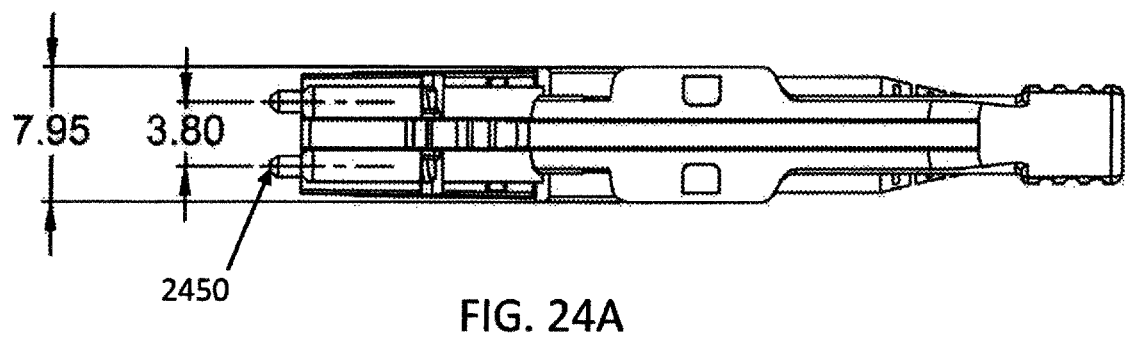
FIG. 24A is an top dimensional view of a connector according to aspects of the present disclosure.
Figure 24B:
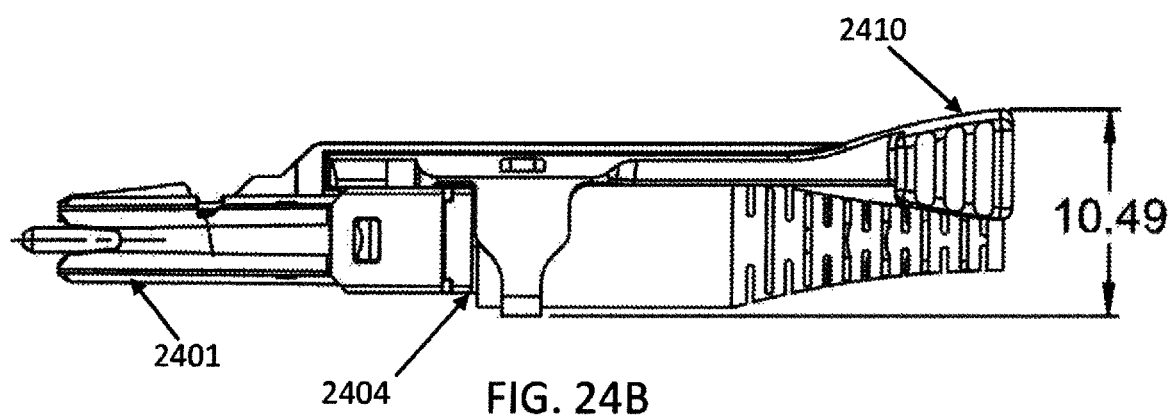
FIG. 24B is an side dimensional view of a connector according to aspects of the present disclosure.

In one or more embodiments, and as shown in FIG. 24A, a CS connector may have an overall dimensional width of 7.95 millimeters. Additionally, in further embodiments, the CS connector may have a pitch of 3.8 mm. As discussed herein, the pitch is defined as the axis-to-axis distance between the central axes of the CS connectors 2450. Moreover, as shown in FIG. 24B, an embodiment may have an overall dimensional height of 10.46 mm when the push-pull tab 2410 is attached to the front body 2401 and the rear body 2404.

Figure 25A:
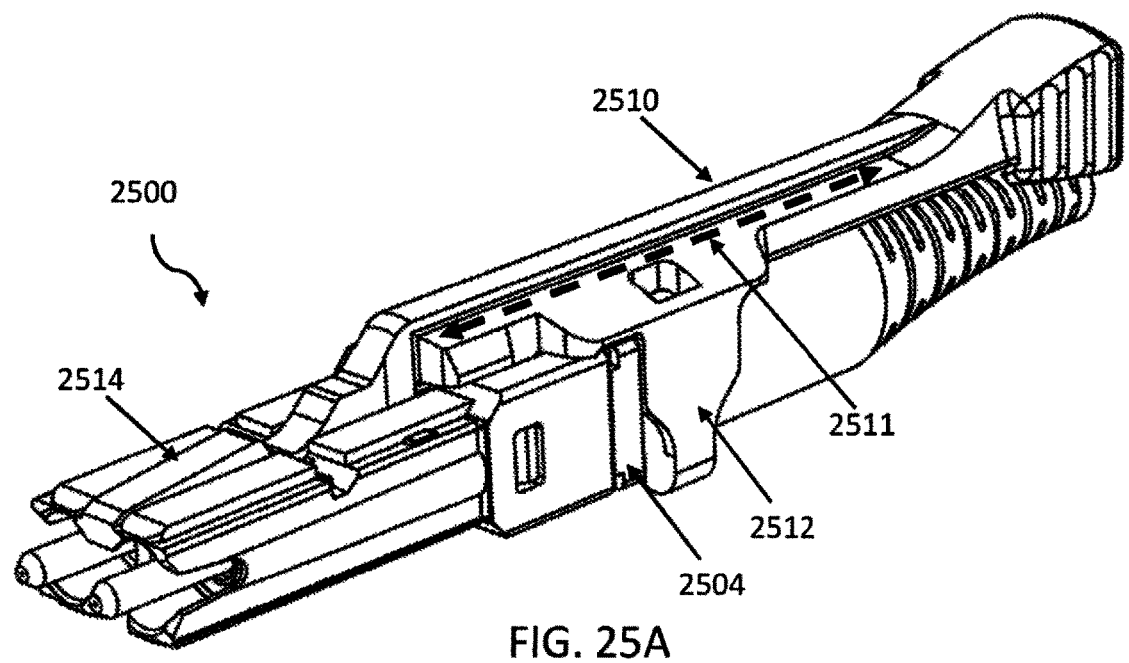
FIG. 25A is a perspective view of a connector with the push-pull tab in the forward position according to aspects of the present disclosure.
Figure 25B:
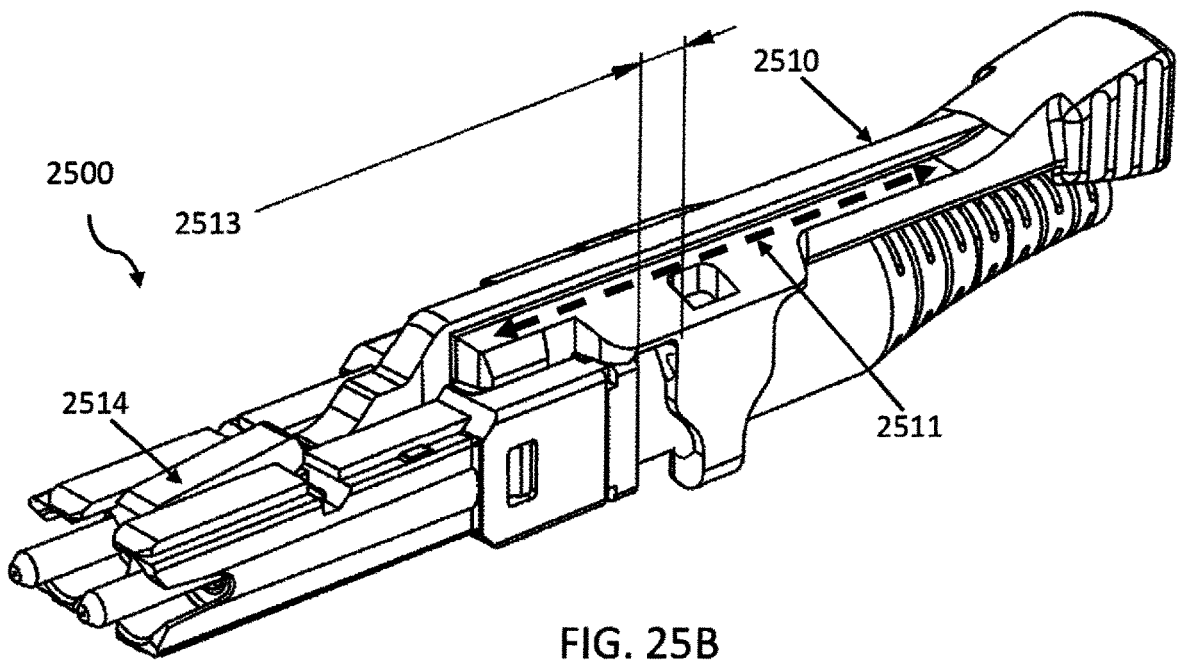
FIG. 25B is a perspective view of a connector with the push-pull tab in the rearward position according to aspects of the present disclosure.

As disclosed herein, a connector (e.g., a CS connector) may have a push-pull tab to allow for easy insertion and extraction from an adapter. Referring now to FIGS. 25A and 25B, in some embodiments, the push-pull tab 2510 may slide forward and rearward in a lengthwise manner in relation to the connector as indicated by the dashed double-sided arrow 2511. FIG. 25A shows an embodiment in which the side portion 2512 of the push-pull tab 2510 contacts the rear body 2504. This contact between the side portion 2512 and the rear body 2504 stops the forward movement of the push-pull tab 2510.

In a further embodiment, the push-pull tab 2510 may be moved away from the rear body by a distance 2513 of about 1 mm to about 3 mm. The push-pull tab 2510 may have a center protrusion (such as 2314 in FIG. 23A) which makes contact with the rear body 2504. This contact between the center protrusion 2514 and the rear body 2504 may stop the rearward movement of the push-pull tab 2510.

Figure 26A:
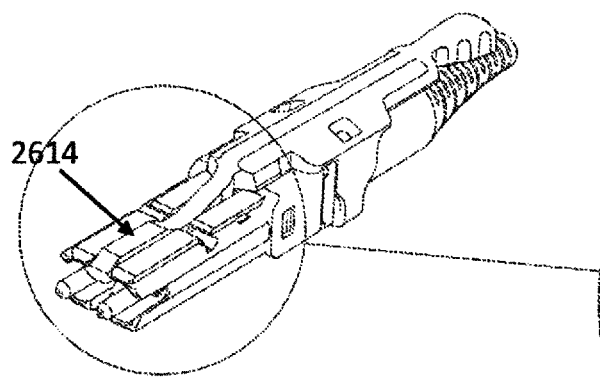
FIG. 26A is a perspective view of a connector with the push-pull tab according to aspects of the present disclosure.
Figure 26B:
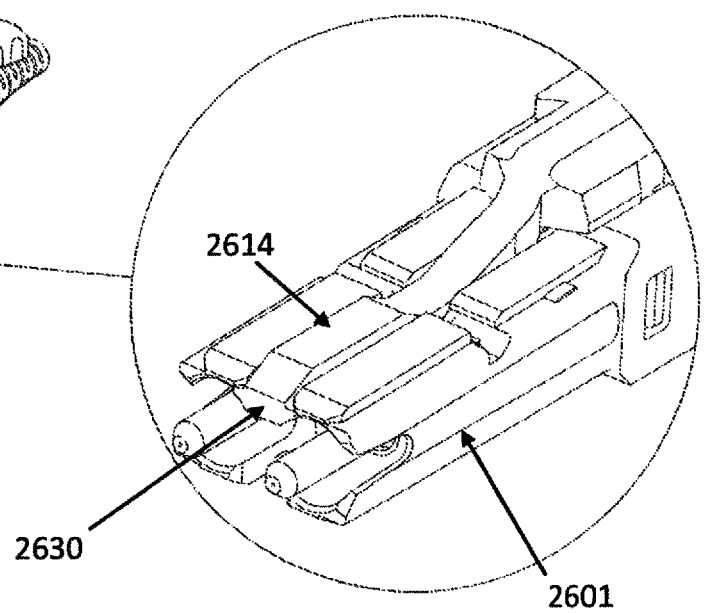
FIG. 26B is a zoomed perspective view of a connector with the push-pull tab according to aspects of the present disclosure.
Figure 26C:
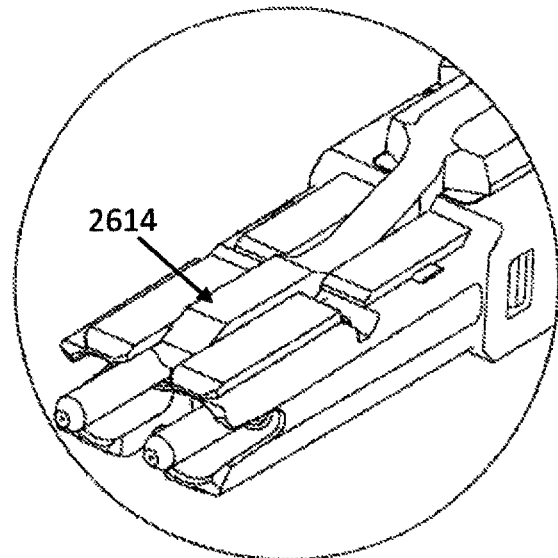
FIG. 26C is another perspective view of a connector with the push-pull tab to aspects of the present disclosure.

Referring to FIGS. 26A-C, a CS connector according to some embodiments is shown. As discussed herein, the push-pull tab has a front portion 2614. In some embodiments, the front portion 2614 may comprise a tip 2630. The tip 2630 may comprise a slit or groove (not shown) which may slide over a portion of the front body 2601 in order to securely fasten the front portion 2614 to the front body 2601. The slit or groove may, in some embodiments, be large enough to accommodate the movement of the push-pull tab as discussed herein. Stated differently, when the push-pull tab is pulled away from the front body (see FIG. 25B and corresponding description) the push-pull tab may slide along the front body (i.e., FIG. 26C), thus the slit or groove must be large enough to allow for the movement of the push-pull tab while also ensuring a secure attachment in the non-retracted state (i.e., FIG. 26B).

Figure 27A:
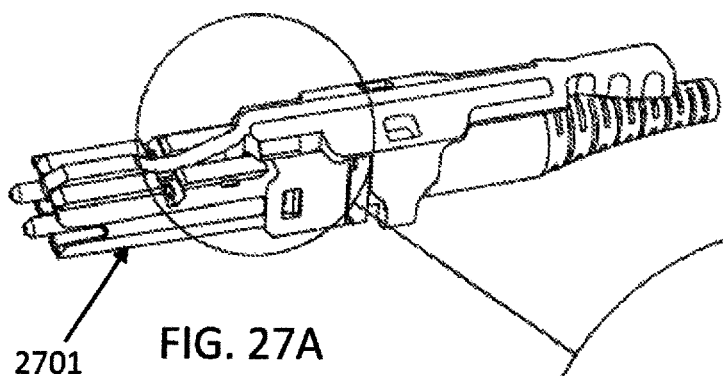
FIG. 27A is a perspective view of a connector with the push-pull tab according to aspects of the present disclosure.
Figure 27B:
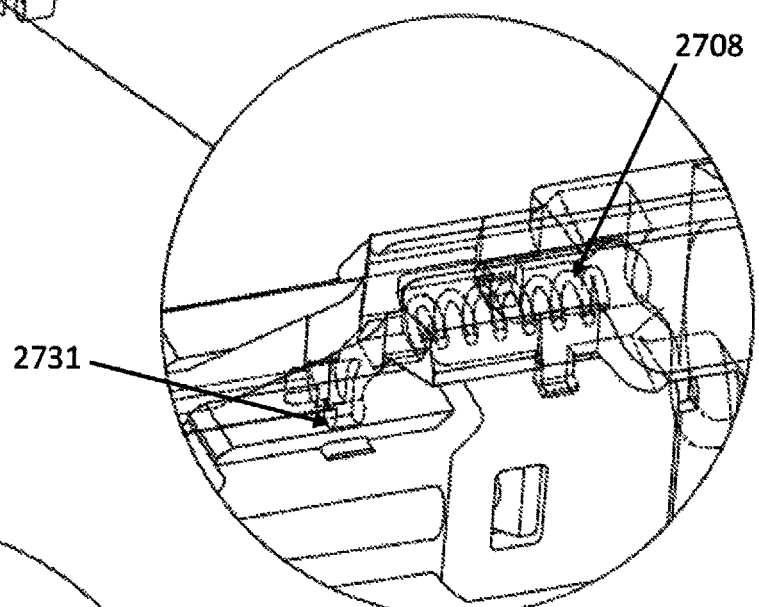
FIG. 27B is a zoomed perspective view of a connector with the push-pull tab according to aspects of the present disclosure.
Figure 27C:
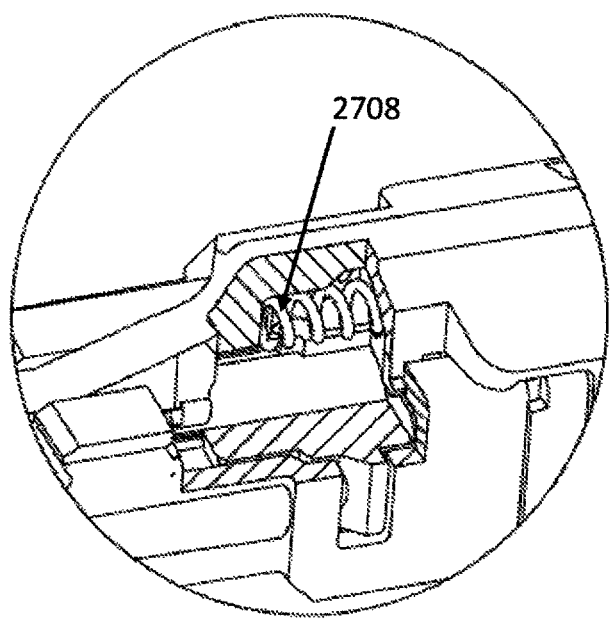
FIG. 27C is another perspective view of a connector with the push-pull tab to aspects of the present disclosure.

As shown in FIG. 27A, and discussed herein, an embodiment may comprise a spring 2708 (i.e., FIG. 23A, 2308). The spring 2708 applies a biasing force to the push-pull tab 2710 in the forward direction such that the groove of the front body 2701 and the groove of the push-pull tab 2710 align as discussed herein, and shown in FIG. 42. As shown in FIG. 27A, the hidden lines show the spring 2708 within the push-pull tab 2710. In additional embodiments, the push-pull tab 2710 may comprise a wedge portion 2731. The wedge portion 2731 is configured such that it can snap into the front body 2701 and slide/traverse the recess (see FIG. 23A at 2317) when the push-pull tab is moved along the housing (i.e., front body and rear body).

Figure 28A:
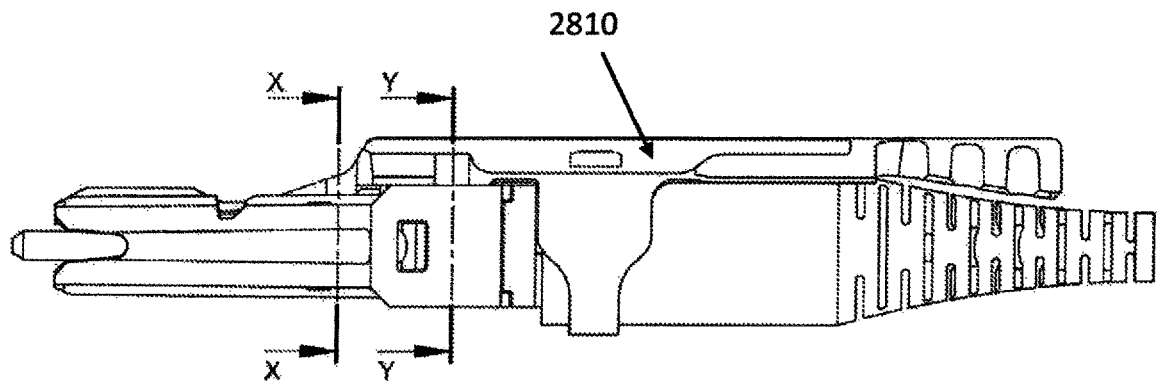
FIG. 28A illustrates an example CS connector according to some embodiments with two separate cross-sectional areas identified.
Figure 28B:
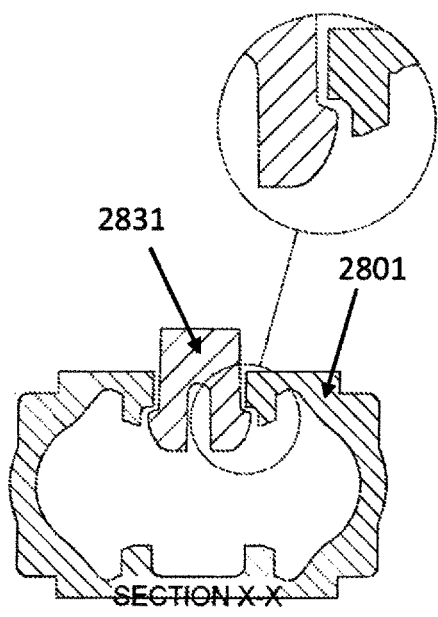
FIG. 28B is a detailed cross section view of a CS connector at the first identified cross-sectional area of the CS connector identified in FIG. 28A.
Figure 28C:
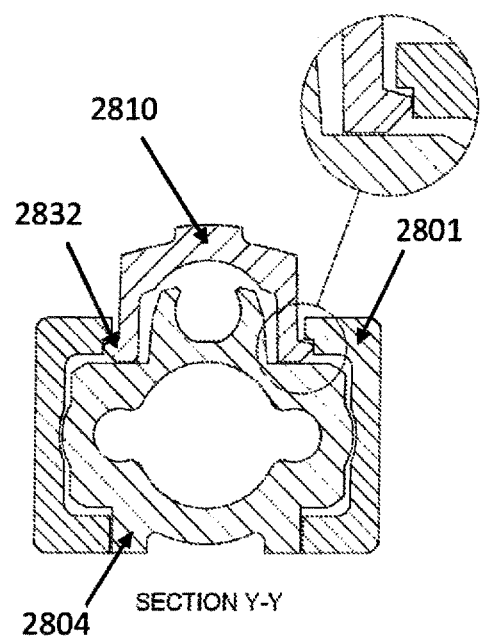
FIG. 28C is a detailed cross sectional view of a CS connector at the second identified cross-sectional area of the CS connector identified in FIG. 28A.

Referring now to FIGS. 28A/B/C, a CS connector is shown including cross-sections of various embodiments. FIG. 28A illustrates an example CS connector according to some embodiments with two separate cross-sectional areas identified. The first cross-sectional area (i.e., X-X) is further detailed in FIG. 28B. FIG. 28B shows how the wedge portion 2831 snaps into, or connects, with the front body 2801. It should be understood, that this material strength of the wedge portion 2831 ensures a secure connection to the front body 2801 while also allowing for the push-pull tab 2810 to move along the length of the front body 2801 as discussed in further detail herein. In additional to the wedge portion 2831, some embodiments may also have a further securing connection device comprising one or more clips 2832 which are formed as part of the push-pull tab. In some embodiments, and as shown, the one or more clips 2832 connect to and snap into the front body 2801 and positioned adjacent to the rear body 2804 which is inserted into the front body. It should be understood that these are non-limiting examples, and that various connection means may be used to secure the push-pull tab 2810 to the housing. Specifically, the wedge portion 2831 and the one or more clips 2832 may be located at various other locations on the push-pull tab 2810, as well as different location on the front body 2801 and the rear body 2804.

Figure 30A:
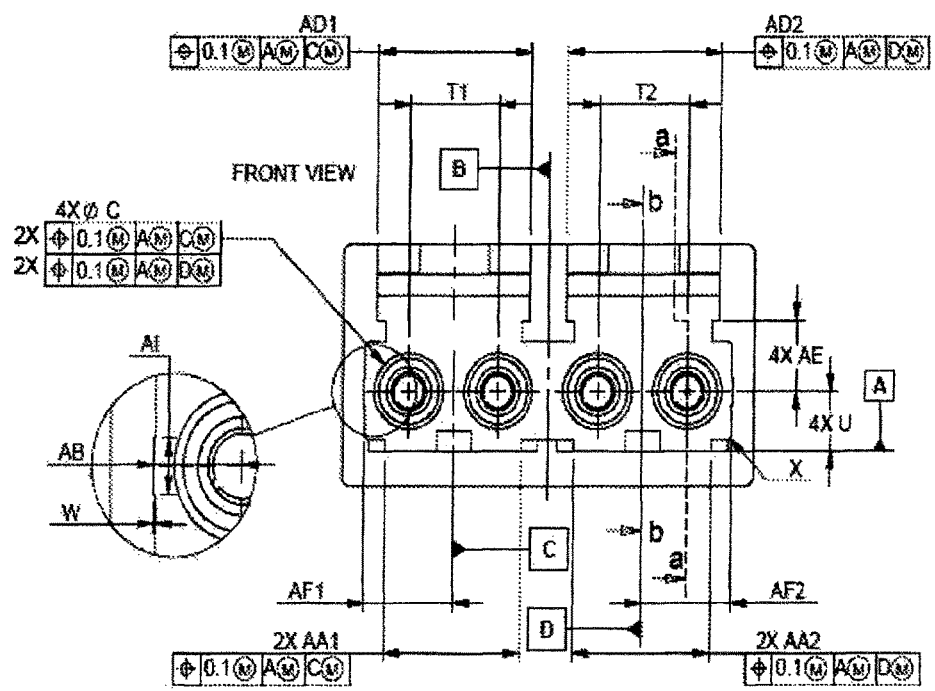
FIG. 30A is a detailed dimensional front view of a duplex adapter/transceiver according to aspects of the present disclosure.
Figure 30B:
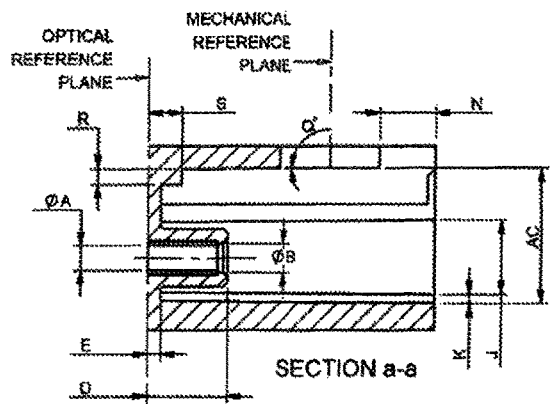
FIG. 30B is a detailed dimensional cross sectional view of a duplex adapter/transceiver according to aspects of the present disclosure.
Figure 30C:
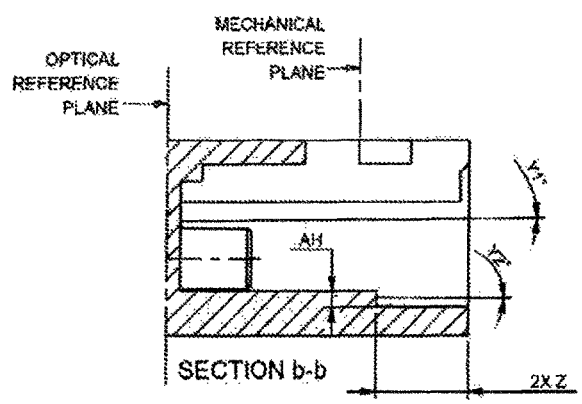
FIG. 30C is another detailed dimensional cross sectional view of a duplex adapter/transceiver according to aspects of the present disclosure.
Figure 31A:
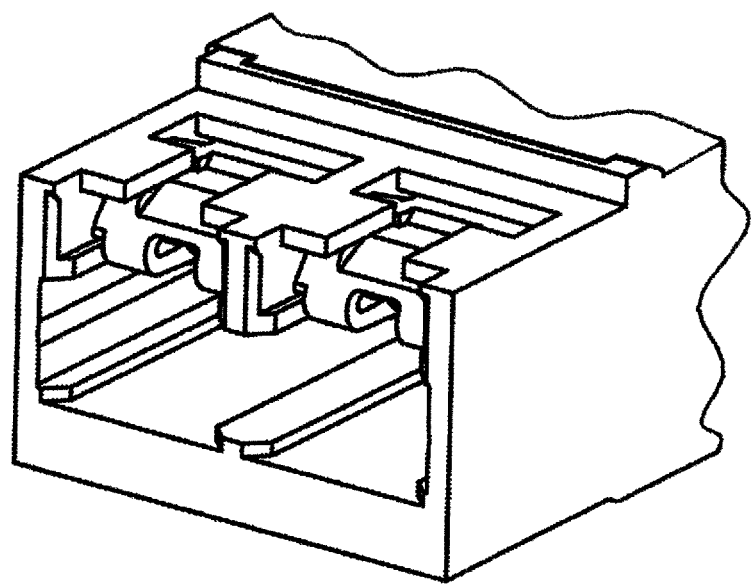
FIG. 31A is a perspective view of a duplex adapter/transceiver with removable anchors installed.
Figure 31B:
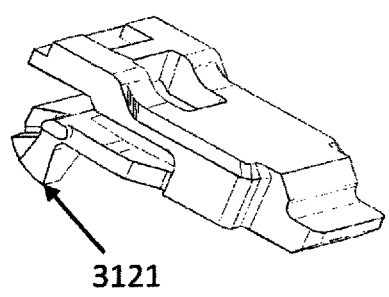
FIG. 31B is a perspective view of a removable anchor device.
Figure 31C:
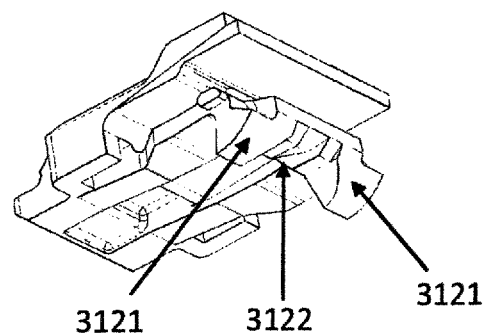
FIG. 31C is another perspective view of a removable anchor device.

The connectors (e.g., CS connectors) disclosed herein may be inserted into an adapter (e.g., a fiber optic port), such as for example in a fiber array or server. A non-limiting illustrative example of a typical adapter is shown in FIG. 30A. FIG. 30A illustrates a dual adapter for accepting two connectors (e.g., a dual ferrule CS connector). It should be understood, that the various dimensions provided herein are only for illustrative purposes, and that various other dimensions may be possible in various implementations. FIGS. 30B and 30C show specific cross-sectional cuts of the adapter shown in FIG. 30A. The various dimensions of FIGS. 30A, 30B, and 30C are listed below in Table 1. As shown in FIGS. 31, 32, and 33, and discussed herein, the receiver/transceiver may allow for the insertion of an anchor device.

TABLE 1

| Reference | Dimensions (mm) | |
| --- | --- | --- |
| | Minimum | Maximum |
| F1 | 6.5 | 6.7 |
| F2 | 6.5 | 6.7 |
| G1 | | 3.8 |
| G2 | | 3.8 |
| GA1 | | 1.90 |
| GA2 | | 1.90 |
| H1 [a, b] | 2.87 | 2.97 |
| H2 [a, b] | 2.87 | 2.97 |
| I1 | 3.7 | 3.8 |
| I2 | 3.7 | 3.8 |
| J1 | 5.75 | 5.85 |
| J2 | 5.75 | 5.85 |
| K | 6.79 | 6.89 |
| L | 1.03 | 1.13 |
| M | | 1.90 |
| N | 0.05 | — |
| P | — | 0.8 |
| Q | — | 1.7 |
| R[a] | — | 1.25 |
| S | 0.55 | 0.75 |
| T | 4.0 | 4.1 |
| U | | 0.3 |
| V | 1.4 | 1.5 |
| W | 2.7 | |
| Y | 0.4 | 0.5 |
| Z | 3.7 | 3.8 |
| AA | 1.44 | 1.54 |
| AB | 4.35 | 4.55 |
| AC1 | | 0.5 |
| AC2 | | 0.5 |
| AD | 2.55 | 2.65 |
| AF | 9.24 | 9.38 |
| AG | 14.55 | 14.65 |
| AI1 | 3.0 | 3.2 |
| AI2 | 3.0 | 3.2 |
| AJ | 7.9 | 8.1 |
| AK1 | 1.43 | 1.53 |
| AK2 | 1.43 | 1.53 |
| AL | | 90 |
| AM | | 2.24 |
| AN | 2.65 | 2.75 |
| AO | 0 | 0.2 |
| AP | 2.1 | 2.3 |
| AQ1 | | 4.0 |
| AQ2 | | 4.0 |
| AR | | 15.38 |
| AS | | 0.5 |
| BA | 8.22 | 8.62 |
| BB | 0.2 | 0.4 |
| BC | 1.1 | 1.3 |
| BD | | (0.75) |
| BE | 3.5 | 3.7 |
| BF | | (1.2) |
| BG | 0.8 | 1.0 |
| P' | 0.75 | — |
| Q' | — | 1.15 |
| AD' | — | 2.3 |
| CA | 7.29 | 7.39 |
| CB | 1.65 | 1.75 |
| CC | 0.3 | — |
| CD | 2.3 | — |
| CE | | (2.2) |
| CF | | (2.95) |
| CG | 2.6 | 2.8 |
| CH | 2.45 | 2.55 |
| CI | 1.95 | 2.05 |
| F' | 6.25 | 6.35 |
| CJ | 1.75 | 1.85 |
| CK | 5.35 | 5.45 |
| CL | 0.67 | 0.77 |
| CM | 1.95 | 2.05 |

Figure 29:
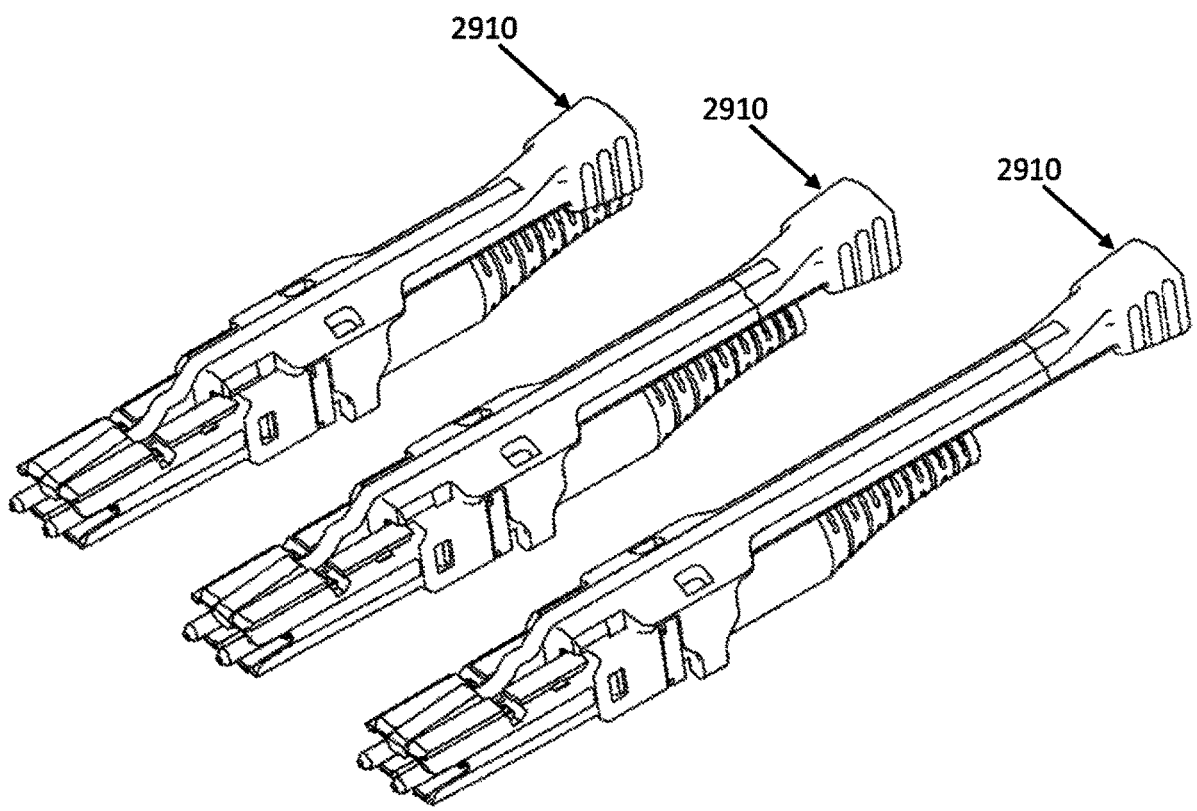
FIG. 29 is a perspective view of various connectors with the push-pull tabs of differing lengths according to aspects of the present disclosure.

It should be understood, that various portions of a connector system (e.g., CS connector system) may have adjustments made to accommodate various situations. One non-limiting example of these variations is shown in FIG. 29, which shows the push-pull tab 2910 being constructed with varying lengths.

The embodiments shown in FIGS. 30A, 30B, and 30C illustrate an adapter capable of receiving various modifications. For example, and referring to FIGS. 31A, 31B, and 31C, in some embodiments, a removable adaptor modification (e.g., the hook system of FIGS. 31B and 31C) may be inserted into the adaptor shown in FIG. 31A. The removable modification device, such as that shown in FIGS. 31B and 31C, may comprise a hook tip 3121 and a hook ramp 3122, or a plurality of either (e.g., as shown, the modification device comprises two hook tips).

Figure 32A:
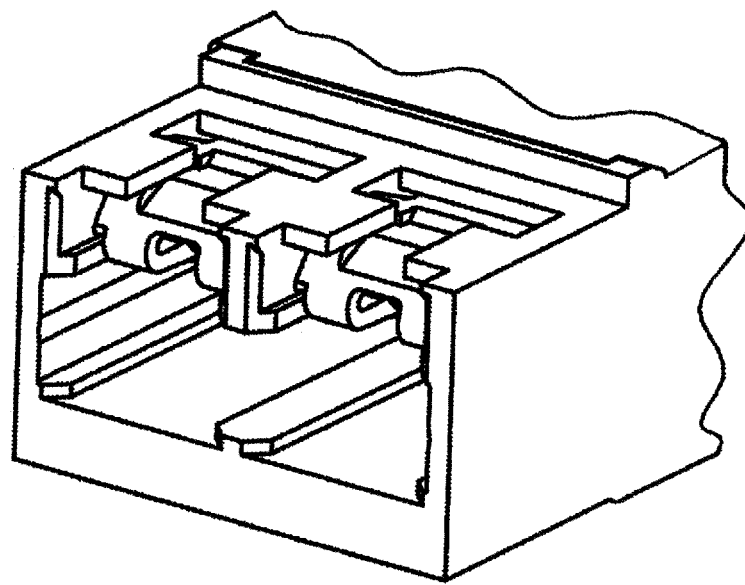
FIG. 32A is another a perspective view of a duplex adapter/transceiver with removable anchors installed.
Figure 32B:
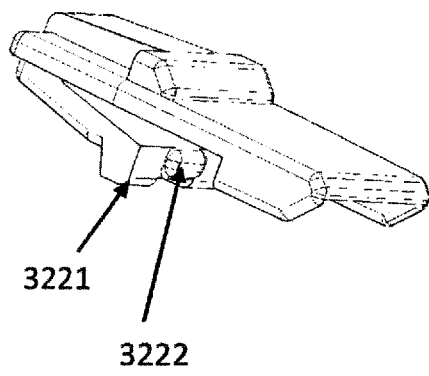
FIG. 32B is another perspective view of a removable anchor device.
Figure 32C:
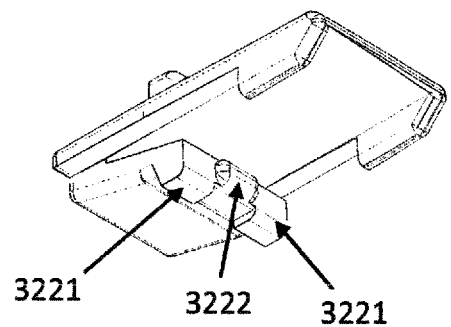
FIG. 32C is another perspective view of a removable anchor device.

It should be understood, that the removable modification device (i.e., interchangeable anchor device) may vary in style and design. FIGS. 32A, 32B and 32C provide an illustrative non-limiting example of a potential design for the interchangeable anchor device. As discussed herein, in some embodiments, a removable adaptor modification (e.g., the hook system of FIGS. 32B and 32C) may be inserted into the adaptor shown in FIG. 32A. The removable modification device, such as that shown in FIGS. 32B and 32C, may comprise a hook tip 3221 and a hook ramp 3222, or a plurality of either (e.g., as shown, the modification device comprises two hook tips).

Figure 33A:
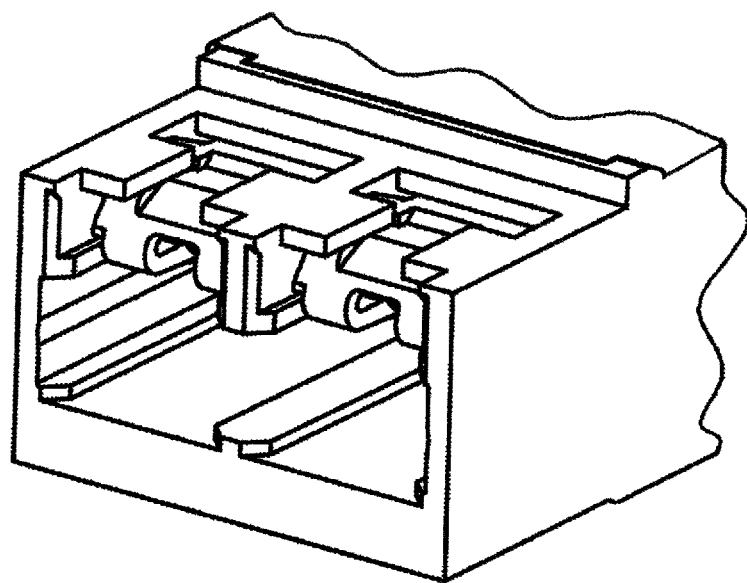
FIG. 33A is another a perspective view of a duplex adapter/transceiver with removable anchors installed.
Figure 33B:
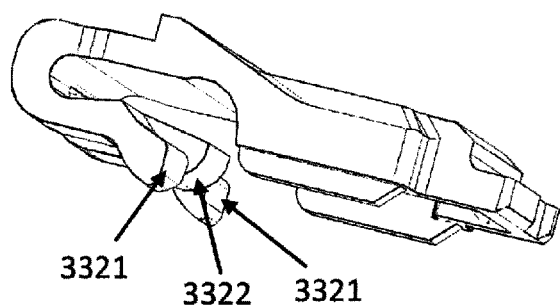
FIG. 33B is another perspective view of a removable anchor device.
Figure 33C:
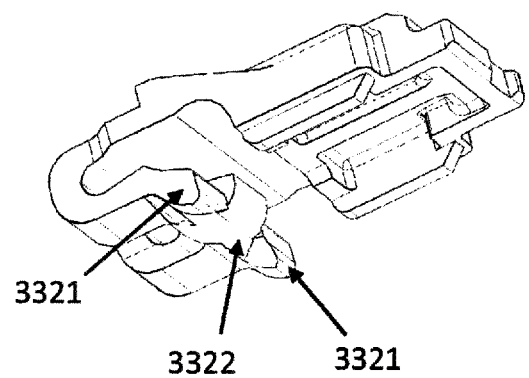
FIG. 33C is another perspective view of a removable anchor device.

In a further embodiment, and as shown in FIGS. 33A, 33B, and 33C, a removable adaptor modification (e.g., the hook system of FIGS. 33B and 33C) may be inserted into the adaptor shown in FIG. 33A. The removable modification device, such as that shown in FIGS. 33B and 33C, may comprise a hook tip 3321 and a hook ramp 3322, or a plurality of either (e.g., as shown, the modification device comprises two hook tips).

Figure 34:
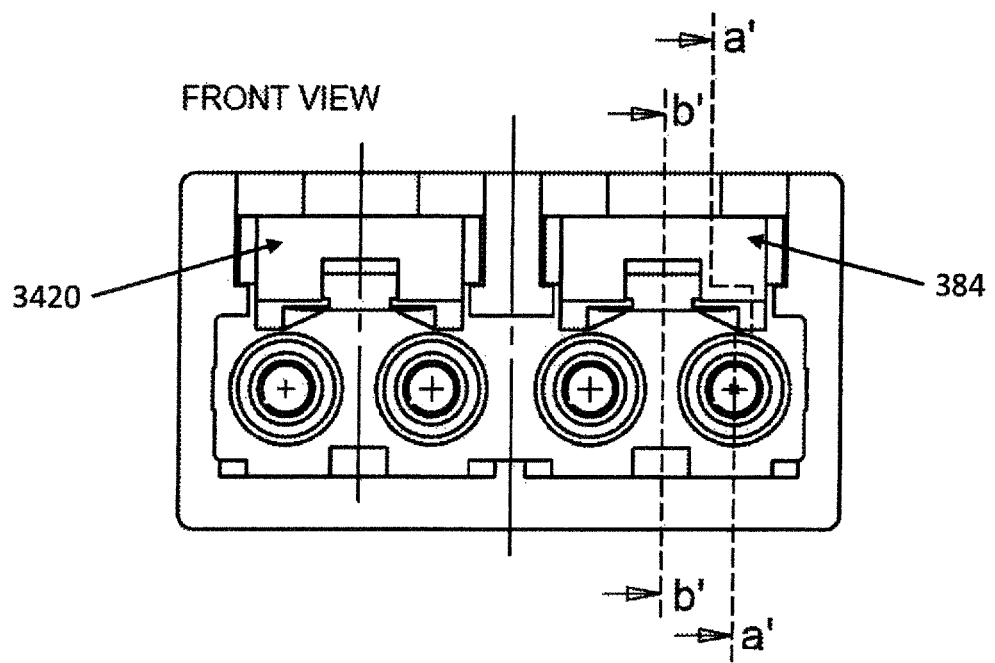
FIG. 34 is a detailed dimensional cross sectional view of a duplex adapter/transceiver with a removable anchor installed according to aspects of the present disclosure.
Figure 35A:
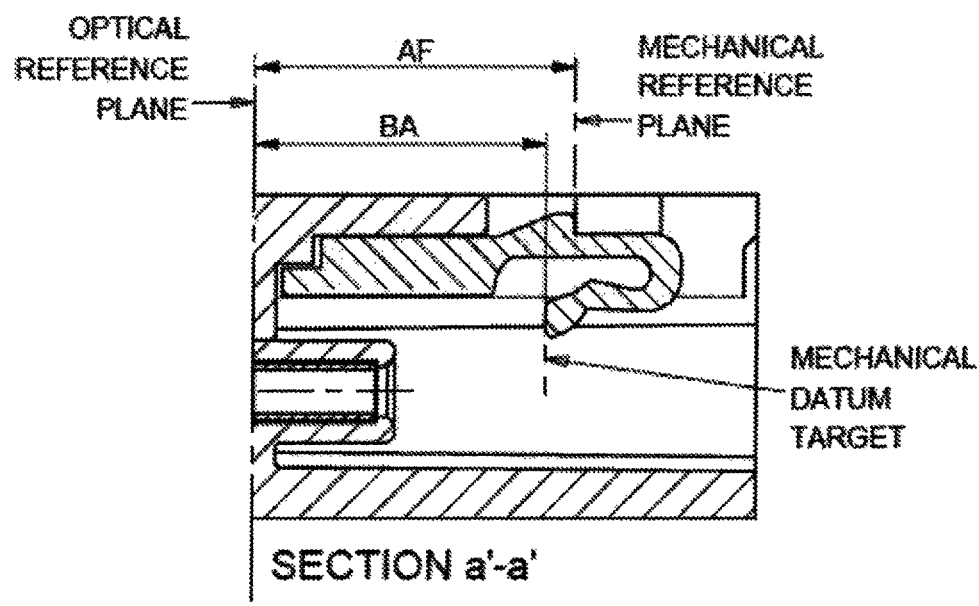
FIG. 35A is another detailed dimensional cross sectional view of a duplex adapter/transceiver with a removable anchor installed according to aspects of the present disclosure.
Figure 35B:
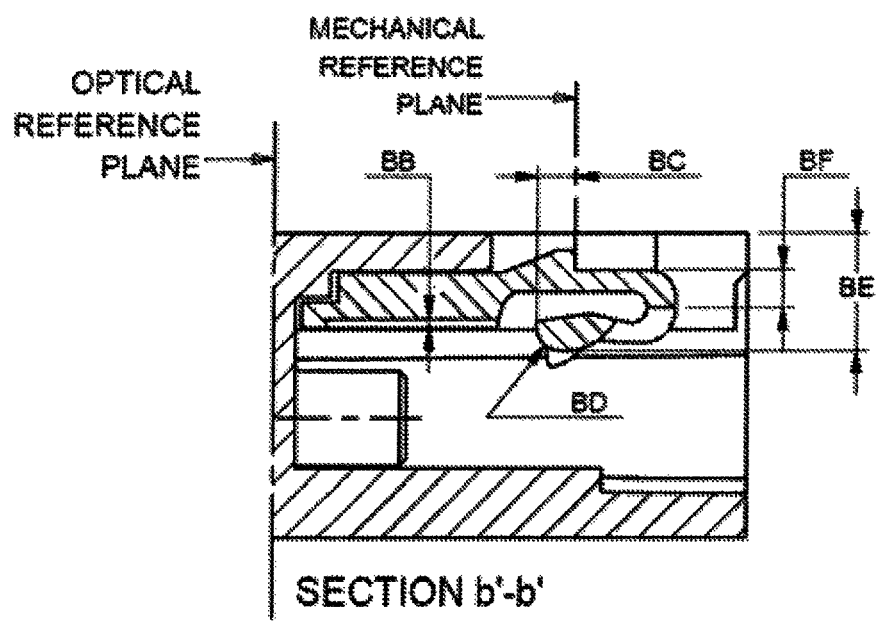
FIG. 35B is a detailed dimensional cross sectional view of a duplex adapter/transceiver with a removable anchor installed according to aspects of the present disclosure.

FIG. 34 illustrates a dual adapter for accepting two connectors (e.g., a dual ferrule CS connector) similar to that shown in FIG. 30A, however, FIG. 34 includes two removable modification devices 3420. It should be understood, that the various dimensions provided herein are only for illustrative purposes, and that various other dimensions may be possible in various implementations. FIGS. 35A and 35B show specific cross-sectional cuts of the adapter shown in FIG. 34, and thus, the identified dimensions of FIGS. 34, 35A and 35B are also listed in Table 1.

Figure 36A:
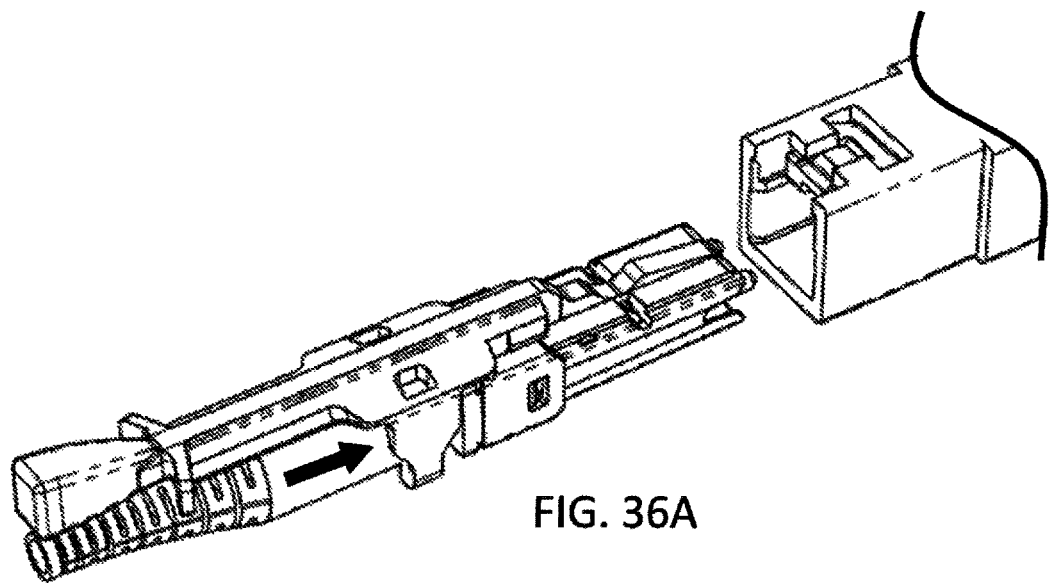
FIG. 36A is a perspective view of a CS connecter being inserted into an adapter/transceiver.
Figure 36B:
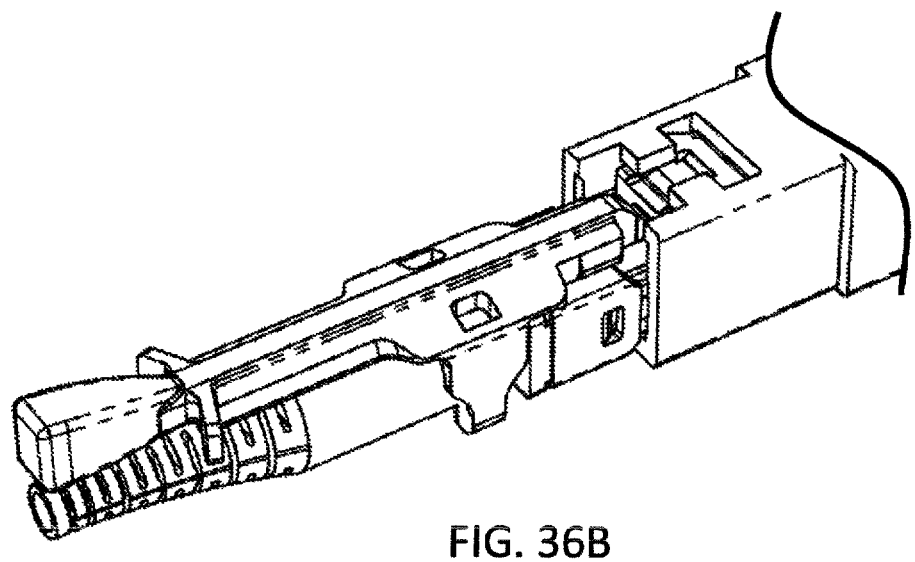
FIG. 36B is a perspective view of a CS connecter after being inserted into an adapter/transceiver.
Figure 37:
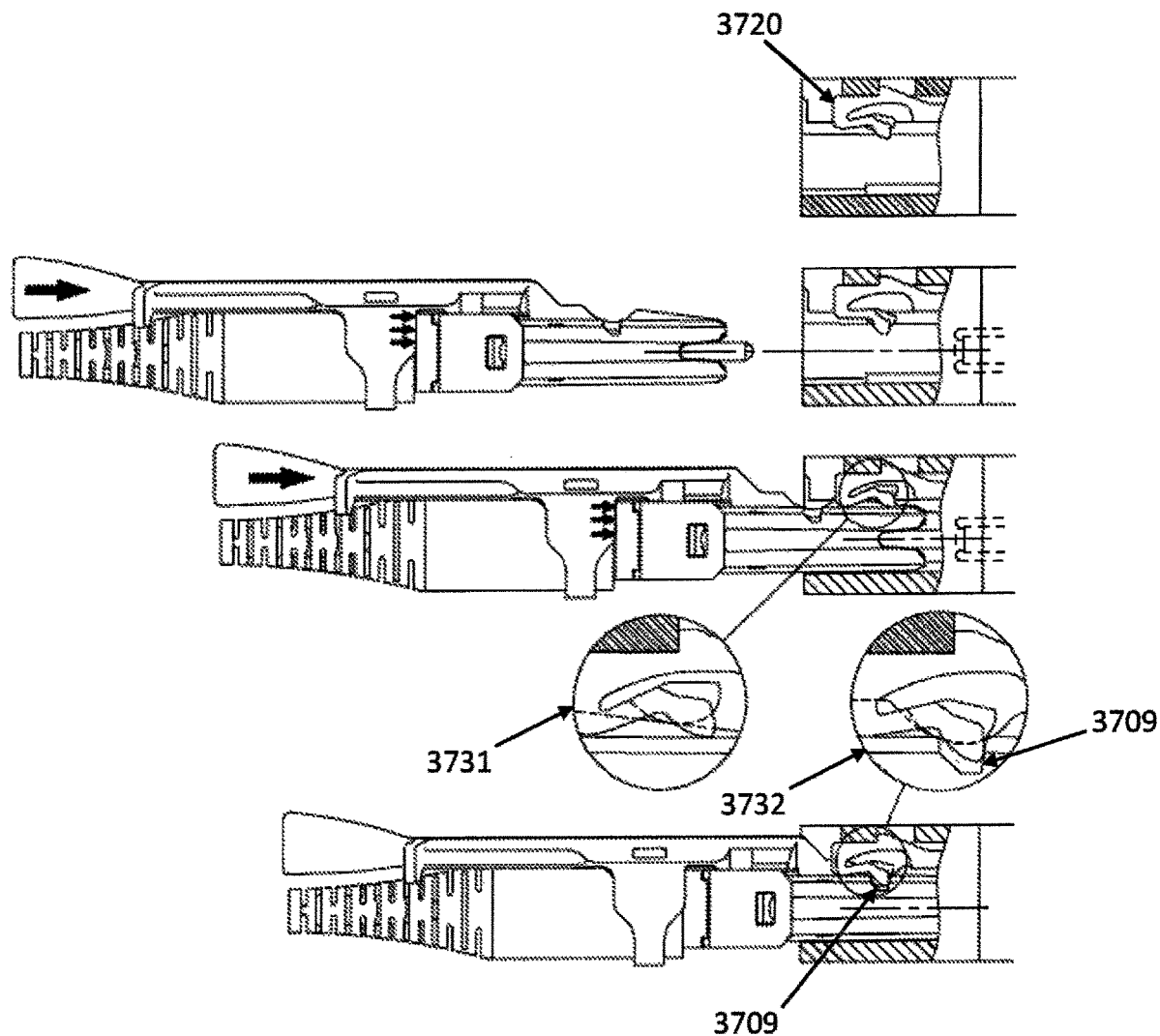
FIG. 37 is side cutaway view of a CS connector being inserted into an adapter/transceiver.

Referring now to FIGS. 36A and 36B, illustrative examples of a CS connector being inserted into an adapter are shown. As discussed herein, the adapter shown in the illustrative embodiment comprises the modification device which engages with portions of the CS connector as discussed below in detail. FIG. 37 shows a CS connector being inserted into an adapter. The modification device 3720 impacts and interacts with the CS connector as the connector is inserted into the adapter housing. In some embodiments, as the CS connector is inserted, the front of the CS connector contacts hook ramp (FIG. 35C at 3522, FIGS. 32B and 32C at 3222, and FIGS. 33B and 33C at 3322) which lifts the portion of the modification device that is interacting with the CS connector.

Still referring to FIG. 37, the movement of the modification device is shown in zoomed-in detail views 3731 and 3732. As shown, the hidden (e.g., dashed) line represents the profile hook ramp 3122, 3222, and 3322, and the solid lines represent the profile of the hook tips 3121, 3221, and 3321. The hooks 3121, 3221, and 3321 rise above the surface of the connector allowing for insertion of the connector into the adapter. Once the connector reaches the predetermined destination within the adapter (e.g., when a secure fiber connection is made), the hook tips 3121, 3221, and 3321 interlock with a recess 3709 on the connector. This interlocking action secures the connector within the adapter housing by tab during push-in action.

Figure 38:
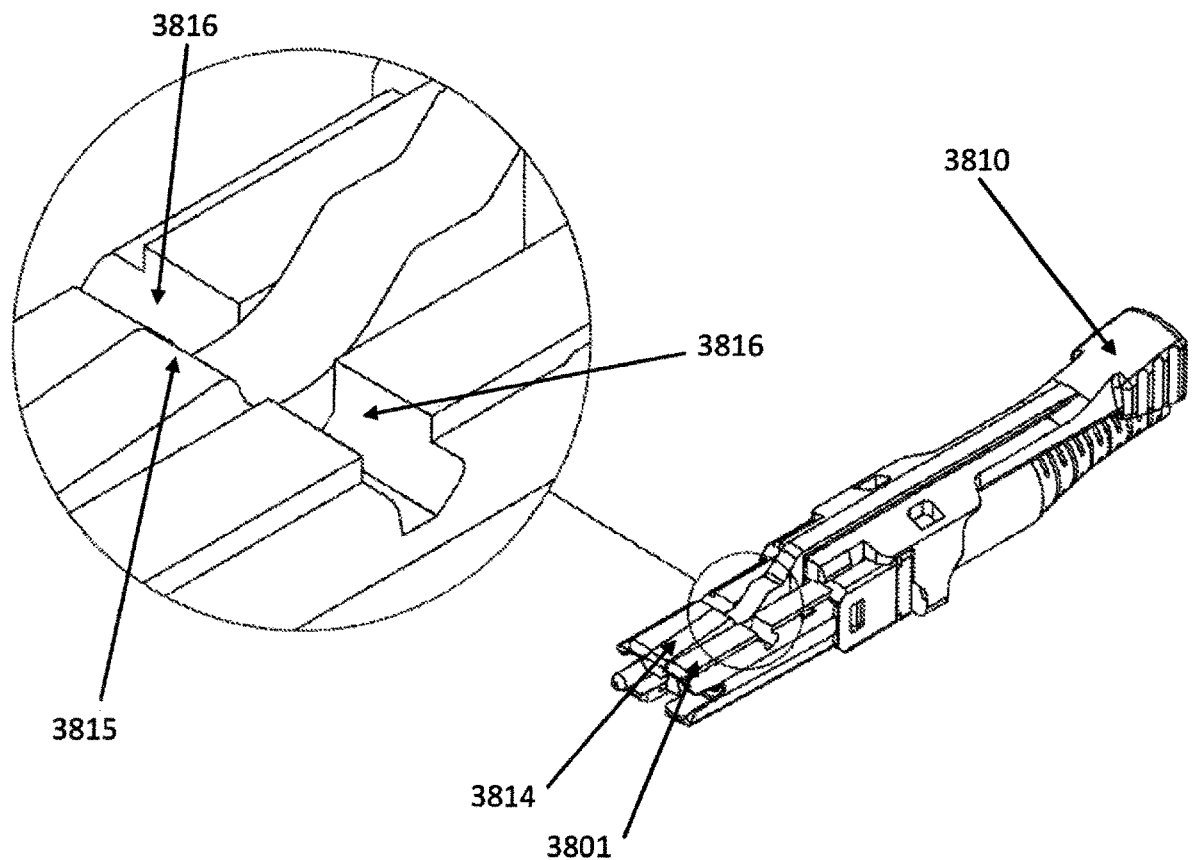
FIG. 38 is a perspective view of a CS connecter with a detailed view of a horizontal groove.

Referring now to FIG. 38, it is important to note that the front portion 3814 of the push-pull tab 3810 moves independently of the front body 3801, as discussed herein. Accordingly, the front portion 3814 of the push-pull tab 3810, which is shown in detail, may align with the recesses 3816 of the front body 3801. In this configuration, the hook tips 3121, 3221, and 3321 are able to securely fasten the connector to the adapter. However, depending on the embodiment, the push-pull tab 3810 may be moved in the forward or rearward direction (see FIGS. 31, 32, and 33) thus taking the recesses 3816 out of alignment with the push pull tab recess. When the front portion 3814 of the push-pull tab 3810 is moved out of alignment, it interacts with the hook ramp 3122, 3222, and 3322 via the ramp 3815. Accordingly, in some embodiments, moving the push-pull tab 3810 independently of the front body 3801 may allow the ramp area 3815 to apply a force to the hook ramp 3122, 3222, and 3322, thereby raising the hook tips 3121, 3221, and 3321. Once the hook tips 3121, 3221, and 3321 are raised, the connector can be safely removed from the adapter and/or transceiver.

Figure 39A:
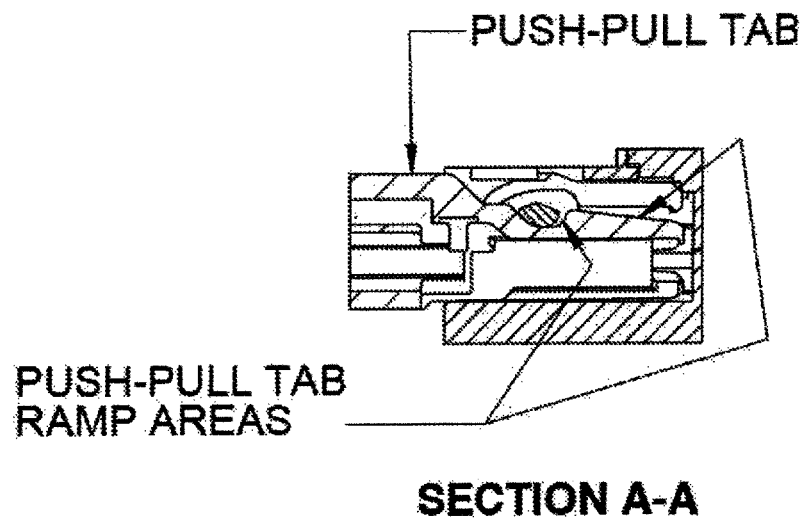
FIG. 39A is a side cutaway view of a CS connector inserted into an adapter/receiver.
Figure 39B:
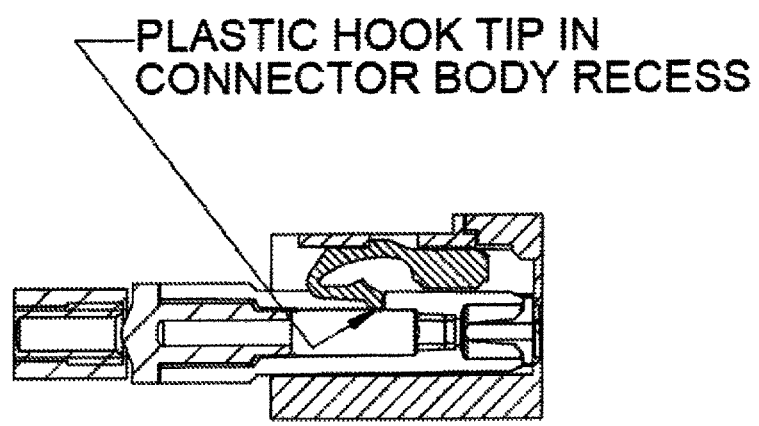
FIG. 39B is another side cutaway view of a CS connector inserted into an adapter/receiver.
Figure 40:
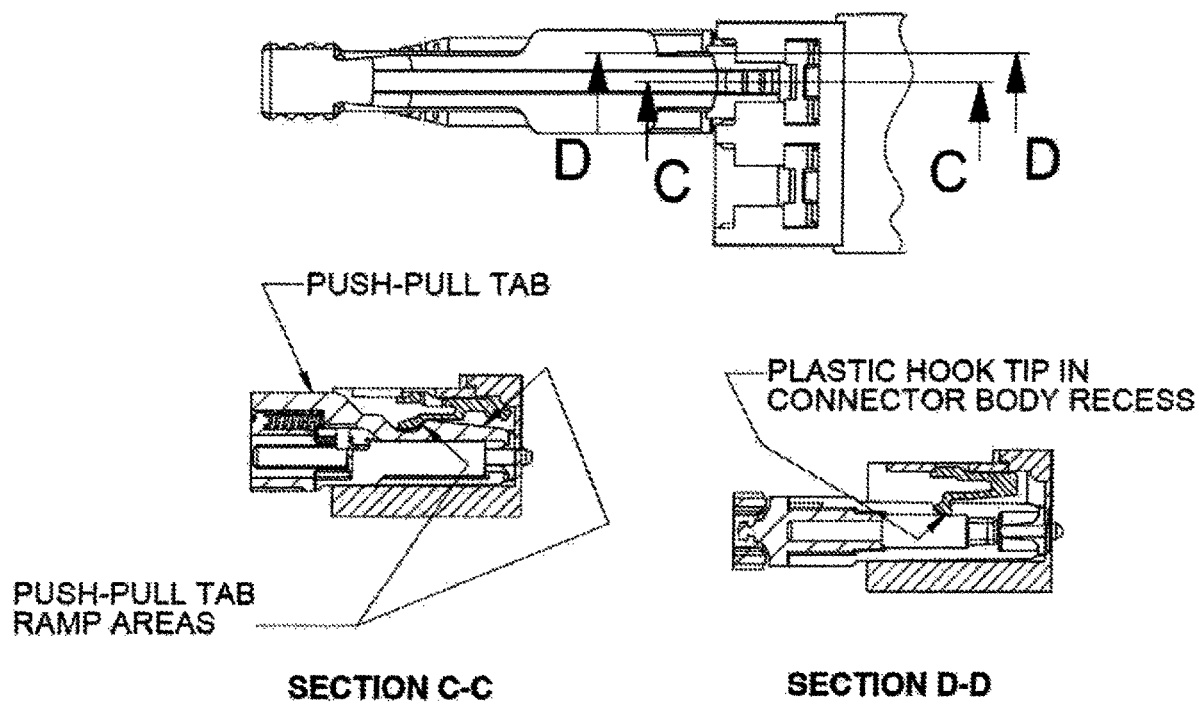
FIG. 40 shows an illustrative top view of a CS connector inserted into an adapter/receiver and a side cutaway view of a CS connector inserted into an adapter/receiver.
Figure 41:
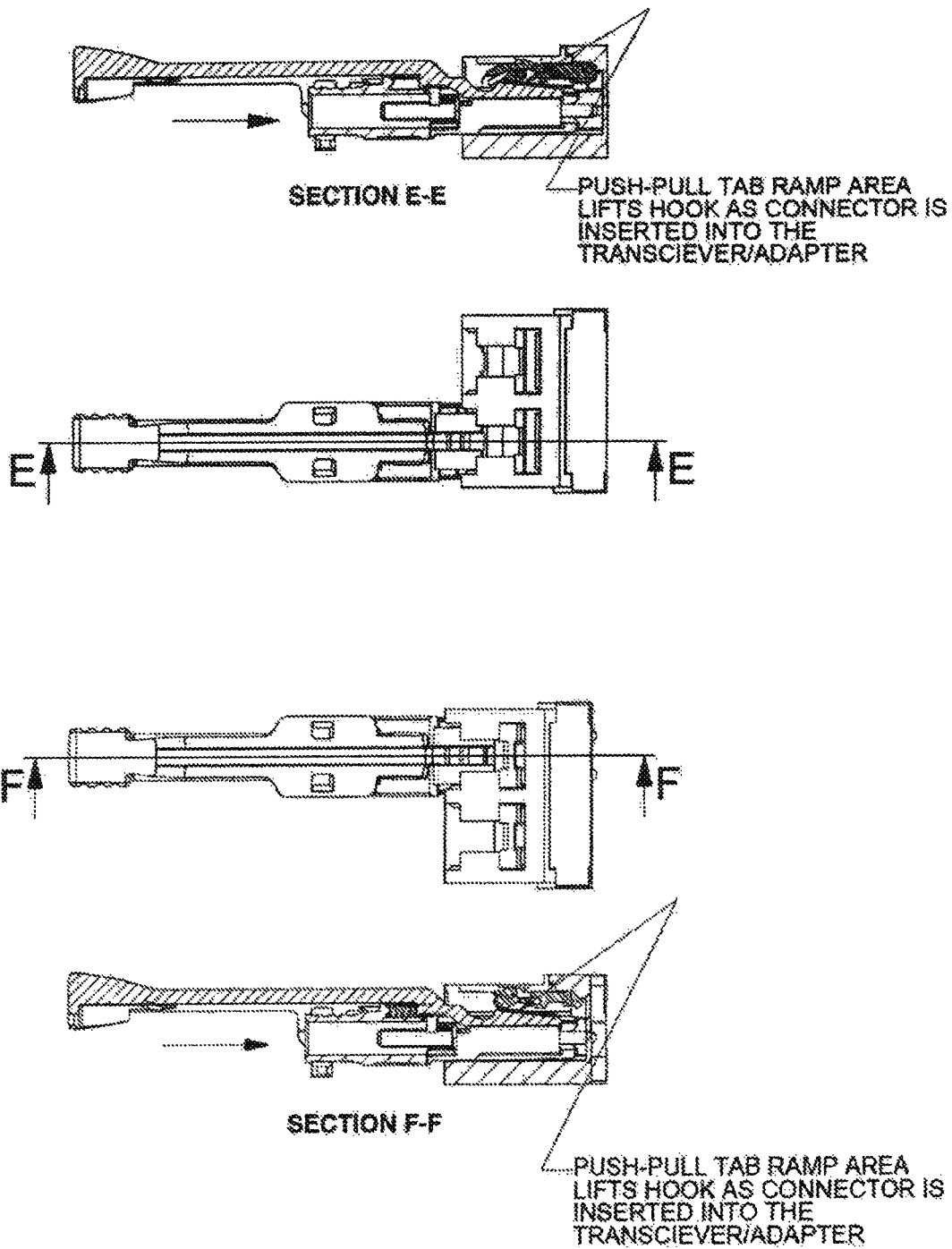
FIG. 41 shows an illustrative top view of CS connector inserted into an adapter/receiver and a side cutaway view of a CS connector inserted into an adapter/receiver.
Figure 42:
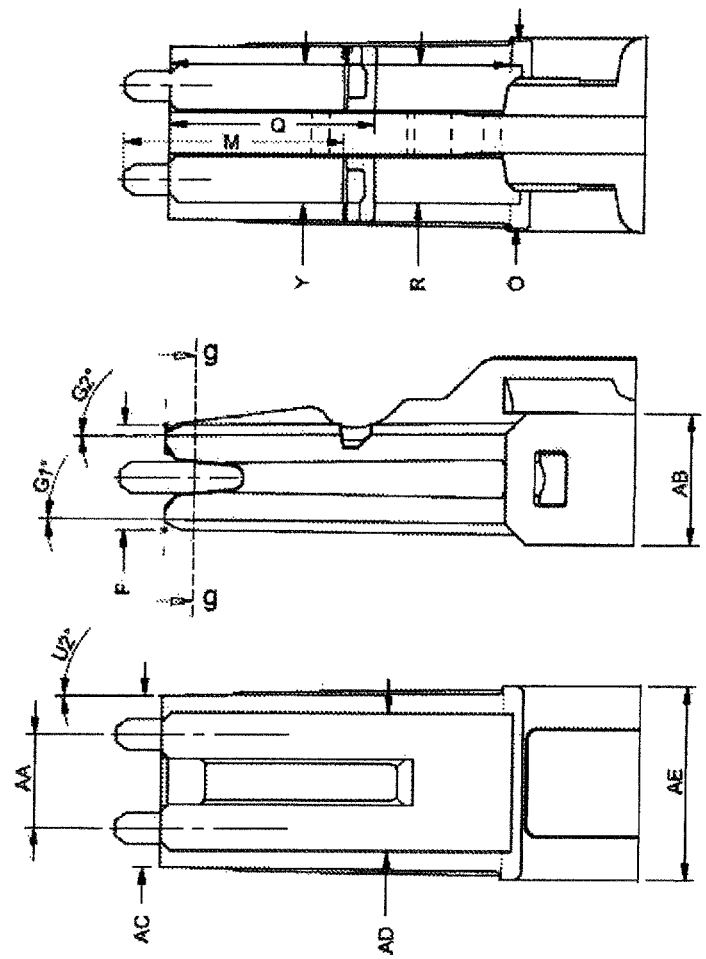
FIG. 42 shows a dimensional detailed view of the CS connector.
Figure 43:
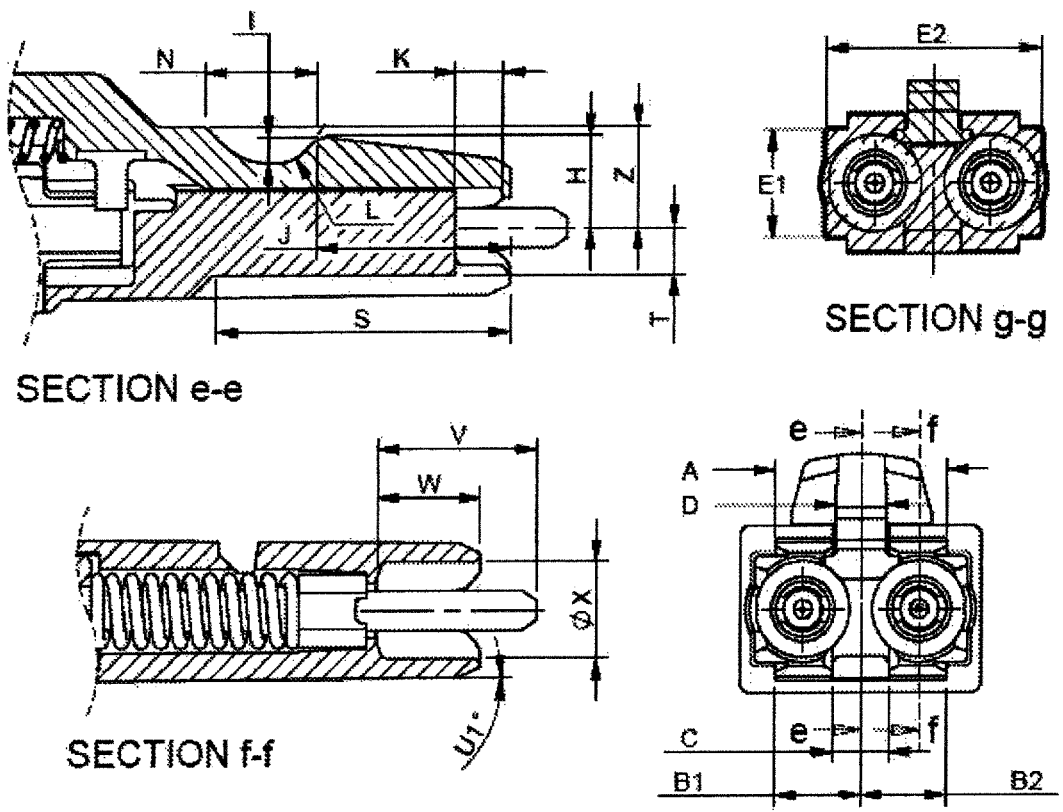
FIG. 43 shows another dimensional detailed view of the CS connector.

FIGS. 39-41 show further detail and cross-sectional illustrations of a connector interacting with an adapter and/or transceiver. Additionally, FIGS. 42 and 43 show further detail and possible dimensions of an embodiment, see Table 2.

TABLE 2

| | Dimensions (mm) | |
|---|---|---|
| Reference | Minimum | Maximum |
| BA' [a] | 8.7 | 8.9 |
| DA | 8.28 | 8.48 |
| DB | 7.45 | 7.6 |
| DC | 5.2 | 5.4 |
| DD | 5.5 | 5.7 |
| DE | 5.5 | 5.7 |
| AG' | 13.75 | 14.05 |
| AM' | 2.08 | 2.18 |
| AN' | 2.08 | 2.18 |
| AC' 1 [b] | — | 0.5 |
| AC' 2 [b] | — | 0.5 |
| Z' [b] | 3.32 | 3.72 |
| AR' [c] | 6.88 | 7.28 |
| DF [c] | — | 0.5 |
| G' | | 3.8 |
| DG | 6.86 | 7.06 |
| J' | 5.5 | 5.7 |
| DI | 7.75 | 7.95 |
| DJ | | (0.81) |
| DK | | (3.57) |
| DL | | (1.3) |
| DM [d] | 1.45 | — |
| DN | | (6.24) |
| AA' | 1.4 | 1.6 |
| AB' | 9.33 | 9.53 |
| DO | | (2.92) |
| DP | | (3.22) |
| DQ [a] | 5.14 | 5.26 |
| T' | 3.3 | 3.4 |
| H' | 3.0 | 3.2 |
| AF' 1 | | (2.80) |
| AF' 2 | | (2.80) |
| AK' | 1.78 | 1.94 |
| DR | — | 0.5 |
| DS | 1.60 | 1.72 |

Figure 44A:
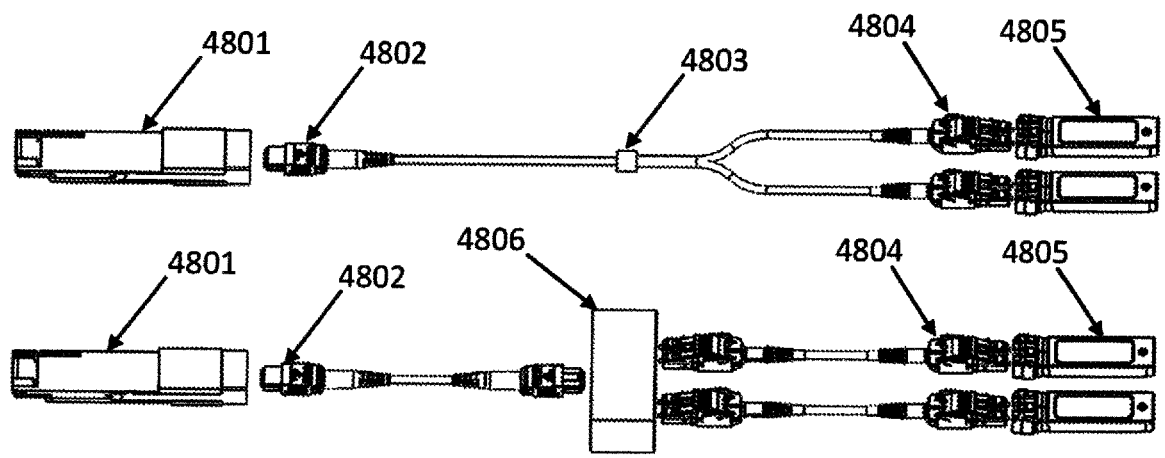
FIG. 44A shows a fan-out and cassette method for distributing the connection to a slower version of the system.

The use of a CS connector allows for a compact fiber implementation, as well as improved flexibility. For example, in some existing systems, as shown in FIG. 44A, a 200G transceiver module 4401 may receive an MPO connector 4402. The MPO connecter may then be split out using an additional tool, such as a fan out 4403 or a cassette 4406. Once the cable is split out, it can be connected to a 100G module device (e.g., a LC uniboot as shown) 4404. The 100G module device 4404 may then be inserted into a 100G transceiver 4405.

Figure 44B:
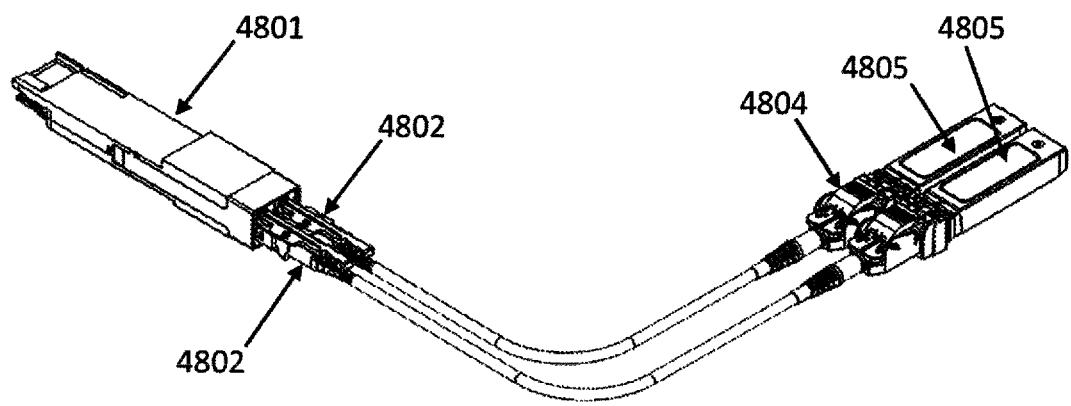
FIG. 44B shows an alternative for distributing the connection to a slower version of the system without requiring a fan-out and/or a cassette method.

Alternatively, in some embodiments, and as shown in FIG. 44B, a plurality of CS connectors 4406 are inserted into a 200G transceiver module 4401. Each CS connector 4406 may then independently connect to the 100 as shown in FIG. 44A, a 200G transceiver module 4401 may receive an MPO connector 4402. The MPO connecter may then be split out using an additional tool, such as a fan out 4403 or a cassette 4406. Once the cable is split out, it can be connected to a 100G module device (e.g., a LC uniboot as shown) 4404. The 100G module device 4404 may then be inserted into a 100G transceiver module 4405.

A specific example using multi-strand cables is shown in FIG. 14 for explanatory purposes only, and it should be understood that near endless alternatives and modifications are possible. As shown, a switch (e.g., 100G switch) 1430 is shown with a transceiver (e.g., 100G transceiver) 1431. The transceiver 1431 has an adapter to receive two mini CS duplex connectors 1432. From each of the two duplex connectors 1432, a four fiber cable 1433 extends to connect to various other connectors and transceivers. As shown, one four fiber cable 1433 is split in to two fiber cables 1434, which are then attached to a single CS simplex connector 1435 and placed into a transceiver (e.g., 25G transceiver) 1436. As further shown, one of the four fiber cables 1437 is connected to a single mini CS duplex connector 1438, which is then inserted into another transceiver (e.g., 50G transceiver) 1439.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. An adapter for receiving a connector, the adapter comprising:
   an adapter housing defining one or more ports having a top and a bottom; and
   at least one anchor device, said one or more ports being configured to releasably receive said at least one anchor device, said at least one anchor device being configured to releasably interlock with the connector upon reception of the connector in said one or more ports,
   wherein the anchor device comprises a uni-body structure with a top and a bottom, and the top and the bottom of the anchor device define a gap;
   wherein the at least one anchor device is configured to be received at the top of the one or more ports such that the bottom of the anchor device is configured to be located above the connector upon reception of the connector in said one or more ports and the bottom of the anchor device is configured to interlockingly engage a top portion of the connector upon reception of the connector in said one or more ports.

2. The adapter of claim 1, the one or more ports comprising at least one cutout on the top.

3. The adapter of claim 1, wherein the top and the bottom of the anchor device are connected substantially at the center of the anchor device.

4. The adapter of claim 1, wherein the top and the bottom of the anchor device are connected substantially at the end of the anchor device.

5. The adapter of claim 1, wherein the bottom of the anchor device comprises at least one hook tip and at least one hook ramp.

6. The adapter of claim 1 wherein the gap is located on the top side of the port so that when the anchor device interlockingly engages the connector in the port, the gap is located above the top side of the connector.

7. The adapter of claim 1 wherein the bottom of each of the ports is free of any anchor device.

8. The adapter of claim 1 wherein the top of each anchor device is adapted for releasably, snap in connection with the adapter.

9. An adapter for receiving a connector, the adapter comprising:
   an adapter housing defining one or more ports having a top and a bottom; and
   at least one anchor device, said one or more ports being configured to releasably receive said at least one anchor device, said at least one anchor device being configured to releasably interlock with the connector upon reception of the connector in said one or more ports,
   wherein the anchor device comprises a uni-body structure with a top portion and a bottom portion, and the top and the bottom portions of the anchor device define a gap;
   wherein the anchor device is configured so that the bottom portion is movable toward the top portion and the gap becomes smaller when the connector is inserted into said one or more ports.

10. The adapter of claim 9, the one or more ports comprising at least one cutout on the top.

11. The adapter of claim 9, wherein the top portion and the bottom portion of the anchor device are connected substantially at the center of the anchor device.

12. The adapter of claim 9, wherein the top portion and the bottom portion of the anchor device are connected substantially at the end of the anchor device.

13. The adapter of claim 9, wherein the bottom portion of the anchor device comprises at least one hook tip and at least one hook ramp.

14. The adapter of claim 9 wherein the gap is located on the top side of the port so that when the anchor device interlockingly engages the connector in the port, the gap is located above the top side of the connector.

15. The adapter of claim 9 wherein the bottom of each of the ports is free of any anchor device.

16. The adapter of claim 9 wherein the top portion of each anchor device is adapted for releasably, snap in connection with the adapter.

* * * * *